United States Patent
Tabata et al.

(10) Patent No.: US 7,322,902 B2
(45) Date of Patent: Jan. 29, 2008

(54) CONTROL DEVICE FOR VEHICULAR TRANSMISSION MECHANISM

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 210 days.

(21) Appl. No.: 11/121,988

(22) Filed: May 5, 2005

(65) Prior Publication Data

US 2005/0247495 A1 Nov. 10, 2005

(30) Foreign Application Priority Data

May 10, 2004 (JP) ............................. 2004-140387
Sep. 22, 2004 (JP) ............................. 2004-275731

(51) Int. Cl.
*B60W 10/18* (2006.01)
(52) U.S. Cl. ............................................. 477/4; 477/5
(58) Field of Classification Search .................. 475/3, 475/5; 477/3–5
See application file for complete search history.

(56) References Cited

U.S. PATENT DOCUMENTS

| 5,730,676 | A | * | 3/1998 | Schmidt | .................. | 475/5 |
| 6,579,201 | B2 | * | 6/2003 | Bowen | .................. | 475/5 |
| 7,179,186 | B2 | * | 2/2007 | Bucknor et al. | .................. | 475/5 |
| 2002/0045507 | A1 | | 4/2002 | Bowen | | |

FOREIGN PATENT DOCUMENTS

| DE | 69705253 T2 | 6/2001 |
| JP | 2000-197208 A | 7/2000 |
| JP | 2000-238555 A | 9/2000 |
| JP | 2003-127681 A | 5/2003 |
| JP | 2003-130202 A | 5/2003 |
| JP | 2003-130203 A | 5/2003 |

OTHER PUBLICATIONS

Oct. 5, 2006 Office Action in German Application No. 10 2005 021 582.3-22 for applicant Toyota Jidosha Kabushiki Kaisha.

* cited by examiner

*Primary Examiner*—Ha D. Ho
(74) *Attorney, Agent, or Firm*—Kenyon & Kenyon LLP

(57) ABSTRACT

A control device for a vehicular drive system including a differential mechanism operable to distribute an output of an engine to a first electric motor and a power transmitting member, and a second electric motor disposed in a power transmitting path between the power transmitting member and a drive wheel of a vehicle. The control device includes a differential-state switching device operable to place the differential mechanism selectively in one of a differential state and a non-differential state, and a switching control device operable to control the differential-state switching device, so as to place the differential mechanism in the differential state when the vehicle is in a motor-drive mode in which at least one of the first and second electric motors is used as a drive power source to drive the vehicle.

28 Claims, 23 Drawing Sheets

| | C0 | C1 | C2 | B0 | B1 | B2 | B3 | SPEED RATIO | STEPPING RATIO |
|---|---|---|---|---|---|---|---|---|---|
| 1st | ◉ | ○ | | | | | ○ | 3.357 | |
| 2nd | ◉ | ○ | | | | ○ | | 2.180 | 1.54 |
| 3rd | ◉ | ○ | | | ○ | | | 1.424 | 1.53 |
| 4th | ◉ | ○ | ○ | | | | | 1.000 | 1.42 |
| 5th | | ○ | ○ | ◉ | | | | 0.705 | 1.42 |
| R | | | ○ | | | | ○ | 3.209 | SPREAD 4.76 |
| N | ○ | | | | | | | | |

○ ENGAGED
◉ ENGAGED FOR STEP-VARIABLE SHIFTING, AND RELEASED FOR CONTINUOUSLY-VARIABLE SHIFTING

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 | |
| N | ○ |  |  |  |  |  | | |

○ ENGAGED

◎ ENGAGED FOR STEP-VARIABLE SHIFTING, AND RELEASED FOR CONTINUOUSLY-VARIABLE SHIFTING

CONTROL DEVICE FOR VEHICULAR TRANSMISSION MECHANISM

The present application is based on Japanese Patent Application Nos. 2004-140387 and 2004-275731 filed on May 10 and Sep. 22, 2004, respectively, the content of which is incorporated herein by reference.

BACKGROUND OF THE INVENTION

1. Field of the Invention

The present invention relates in general to a control device for a vehicular drive system including a differential mechanism functioning as a transmission capable of performing a differential function, and more particularly to techniques for controlling the differential mechanism in a motor-drive mode in which only an electric motor is used as a vehicle drive power source.

2. Description of Related Art

There is known a vehicular drive system including a differential mechanism arranged to distribute an output of an engine to a first electric motor and an output shaft, and a second electric motor disposed between the output shaft of the differential mechanism and drive wheels of a vehicle. Examples of this type of vehicular drive system include drive systems for a hybrid vehicle as disclosed in JP-2003-130202A, JP-2003-130203A, JP-2003-127681A, JP-2000-238555A and JP-2000-197208A, typically in JP-2003-130202A. In these hybrid vehicle drive systems, the differential mechanism is constituted by a planetary gear set, for example, and a major portion of the drive force generated by the engine is mechanically transmitted to the drive wheels through the differential function of the differential mechanism, while the rest of the drive force is electrically transmitted from the first electric motor to the second electric motor, through an electric path therebetween, so that the differential mechanism functions as a transmission the speed ratio of which is electrically variable, thereby making it possible to drive the vehicle with the engine kept in an optimum operating state with an improved fuel economy.

A continuously variable transmission is generally known as a power transmitting mechanism suitable for improving the fuel economy of a vehicle, while on the other hand a gear type transmission device or a step-variable automatic transmission is known as a power transmitting mechanism suitable for improving the power transmitting efficiency. However, there is not known any power transmitting mechanism that is suitable for improving both of the fuel economy and the power transmitting efficiency. The hybrid vehicle drive system disclosed in JP-2003-130202A, for example, has an electric path through which an electric energy is transmitted from the first electric motor to the electric motor, that is, a power transmitting path through which a portion of the vehicle drive force which has been converted from a mechanical energy into an electric energy is transmitted. This drive system requires the first electric motor to be large-sized with an increase of the required output of the engine, so that the second electric motor operated with the electric energy supplied from the first electric motor is also required to be large-sized, whereby the drive system tends to be unfavorably large-sized. The same drive system also suffers from a risk of deterioration of the fuel economy due to conversion of a portion of the mechanical energy produced by the engine into an electric energy, which is subsequently converted into a mechanical energy to be transmitted to the drive wheels of the vehicle. A similar problem is encountered in a vehicular drive system wherein the differential mechanism is used as a transmission the speed ratio of which is electrically variable, for instance, as a continuously variable transmission which is a so-called "electrically controlled CVT".

For example, the hybrid vehicle drive system is arranged to drive the vehicle in a motor-drive mode with only the second electric motor being used as the vehicle drive power source and the engine being held in its non-operated state, while the vehicle is in a low-load running state in which the operating efficiency of the engine is generally lower than in a high-load (high-torque) running state. In this motor-drive mode using the second electric motor as the vehicle drive power source, the speed of the engine in its non-operated state is held substantially zero with the differential function or action of the differential mechanism, to reduce a tendency of dragging of the engine (a resistance to reciprocating movements of the pistons), for thereby improving the fuel economy of the vehicle.

The differential mechanism has various modes of operation or control. The fuel economy in the motor-drive mode may be deteriorated in some of those modes of operation or control.

SUMMARY OF THE INVENTION

The present invention was made in view of the background art described above. It is therefore an object of the present invention to provide a control device for a vehicular drive system including a differential mechanism functioning as a transmission capable of performing a differential function, which permits an improvement of the fuel economy in the motor-drive mode.

The object indicated above may be achieved according to any one of the following modes of the invention, each of which is numbered like the appended claims and depends from the other mode or modes, where appropriate, for easier understanding of technical features disclosed in the present application and possible combinations of those features. It is to be understood that the present invention is not limited to those technical features or combinations thereof.

(1) A control device for a vehicular drive system including a differential mechanism operable to distribute an output of an engine to a first electric motor and a power transmitting member, and a second electric motor disposed in a power transmitting path between the power transmitting member and a drive wheel of a vehicle, the control device comprising (a) a differential-state switching device operable to place the differential mechanism selectively in one of a differential state and a non-differential state, and (b) switching control means for controlling the differential-state switching device, so as to place the differential mechanism in the differential state when the vehicle is in a motor-drive mode in which at least one of the first and second electric motors is used as a drive power source to drive the vehicle.

In the control device according to the above-described mode (1) of the invention, the differential mechanism provided with the differential-state switching device is switchable between the differential state in which the differential function of the differential mechanism is available, and the non-differential state in which the differential function is not available. In the motor-drive mode in which the engine is in the non-operated state and only at least one of the first and second electric motors is used as the vehicle drive power source, the switching control means controls the differential-state switching device, so as to place the differential mechanism in the differential state, so that the speed of the engine is held substantially zero, owing to the differential function of the differential mechanism, whereby a tendency of dragging of the engine (resistance to reciprocating movements of the pistons) in its non-operated state is prevented, and the fuel economy is accordingly improved.

(2) The control device according to the above-described mode (1), further comprising a shifting-state selecting device manually operable to select one of the differential and non-differential states of the differential mechanism, and wherein the switching control means controls the differential-state switching device so as to place the differential mechanism in the differential state in the motor-drive mode of the vehicle, even when the non-differential state is selected by the shifting-state selecting device. Since the fuel economy is higher in the differential state of the differential mechanism than in the non-differential state, the vehicle can be run with an improved fuel economy in the motor-drive mode, which is selected when the vehicle is in a low-load state.

(3) The control device according to the above-described mode (1) or (2), further comprising engine-starting requirement determining means for determining whether starting of the engine is required, and wherein the switching control means controls the differential-state switching device so as to switch the differential mechanism to the non-differential state, even in the motor-drive mode of the vehicle, when the engine-starting requirement determining means has determined that the starting of the engine is required. When the starting of the engine is required, therefore, the speed of the engine can be raised from zero, to facilitate the ignition of the engine, for thereby reducing the deterioration of the fuel economy upon starting of the engine, with a result of an improvement of the fuel economy.

(4) The control device according to the above-described mode (3), further comprising a drive-mode selector switch manually operable to select a power drive mode in which the vehicle is driven with a higher degree of drivability than in a normal drive mode, and wherein the engine-starting requirement determining means determines that the starting of the engine is required, when the power drive mode is selected by the drive-mode selector switch. In the power drive mode, therefore, the differential mechanism is switched to the non-differential state, to permit an early or smooth ignition of the engine and a rapid increase of the drive torque, so that the vehicle can be run with a relatively high degree of drivability in the power drive mode.

(5) The control device according to any one of the above-described modes (1)-(4), wherein the differential mechanism has a first element fixed to the engine, a second element fixed to the first electric motor, and a third element fixed to the power transmitting member, and the differential-state switching device is operable to permit the first, second and third elements to be rotatable relative to each other, for thereby placing the differential mechanism in the differential state, and to connect the first, second and third elements to each other for rotation as a unit or hold the second element stationary, for thereby placing the differential mechanism in the non-differential state. Thus, the differential mechanism is constructed so as to be switchable between the differential and non-differential states.

(6) The control device according to claim 5, wherein the differential-state switching device includes a clutch operable to connect selected two of the three elements to each other for rotation of the first, second and third elements as a unit, and/or a brake operable to fix the second element to a stationary element for holding the second element stationary. This differential-state switching device permits easy switching of the differential mechanism between the differential and non-differential states.

(7) The control device according to any one of the above-described modes (1)-(6), wherein the vehicular drive system further includes a step-variable automatic transmission disposed in the power transmitting path between the power transmitting member and the drive wheel. In this case, the vehicle drive force can be adjusted over a wide range, by utilizing the speed ratio of the automatic transmission.

(8) A control device for a vehicular drive system including a differential mechanism operable to distribute an output of an engine to a first electric motor and a power transmitting member, and a second electric motor disposed in a power transmitting path between the power transmitting member and a drive wheel of a vehicle, the control device comprising (a) a differential-state switching device operable to place the differential mechanism selectively in one of a differential state and a non-differential state, (b) engine-starting requirement determining means for determining whether starting of the engine is required, and (c) switching control means for controlling the differential-state switching device, so as to place the differential mechanism in the non-differential state when the engine-starting requirement determining means has determined that the starting of the engine is required in a motor-drive mode of the vehicle in which at least one of the first and second electric motors is used as a drive power source to drive the vehicle.

In the control device according to the above-described mode (8) of this invention, the differential mechanism is provided with the shifting-state switching device to place the differential mechanism in one of the differential and non-differential states. In the motor-drive mode in which the engine is in the non-operated state and only at least one of the first and second electric motors is used to drive the vehicle, the switching control means controls the shifting-state switching device, so as to switch the differential mechanism to the non-differential state, when the engine-starting requirement determining means has determined that the starting of the engine is required. Accordingly, the speed of the engine can be raised from zero, to facilitate the ignition of the engine, for thereby reducing the deterioration of the fuel economy upon starting of the engine, with a result of an improvement of the fuel economy.

(9) A control device for a vehicular drive system including a differential portion having a differential mechanism operable to distribute an output of an engine to a first electric motor and a power transmitting member, and a second electric motor disposed in a power transmitting path between the power transmitting member and a drive wheel of a vehicle, the vehicular drive system further including an automatic transmission portion which constitutes a portion of the power transmitting path and which functions as an automatic transmission, the control device comprising (a) a differential-state switching device operable to place the differential mechanism selectively in one of a differential state and a non-differential state, and (b) switching control means for controlling the differential-state switching device, so as to place the differential mechanism in the differential state when the vehicle is in a motor-drive mode in which at least one of the first and second electric motors is used as a drive power source to drive the vehicle.

In the control device according to the above-described mode (9), the differential mechanism is placed selectively in one of the differential state and the non-differential or locked state, by the differential-state switching device. Accordingly, the vehicular drive system has not only an advantage of an electrically controlled continuously variable transmission the speed ratio of which is electrically variable and which has a relatively high degree of fuel economy, but also an advantage of a gear type transmission which is operable to mechanically transmit a drive force and which has a relatively high power transmitting efficiency. When the vehicle is in a low- or medium-speed running state or a low- or medium-output running state, with the engine operating in a normal output state, for example, the differential mechanism is placed in the differential state in which the fuel economy is relatively high. When the vehicle is in a high-speed running state, on the other hand, the differential mechanism is placed in the non-differential or locked state in which the output of the engine is transmitted to the vehicle drive wheel primarily through a mechanical power transmitting path, so that the fuel economy is improved owing to a reduction of a loss of conversion of a mechanical energy into an electric energy, which would take place when the differential mechanism is operated as the electrically controlled continuously variable transmission the speed ratio of which is electrically variable. Where the differential mechanism is placed in the non-differential state only when the vehicle is in a high-output running state, the differential mechanism is placed in the differential state and operated as the electrically controlled continuously variable transmission, when the vehicle is in the low- or medium-speed running state or low- or medium-output running state, so that the maximum amount of an electric energy that must be generated by the at least one of the first and second electric motors can be reduced, making it possible to reduce the required size or sizes of the first electric motor and/or the second electric motor, and the required overall size of the vehicular drive system.

Further, the differential mechanism is switched by the switching control means to the differential state in the motor-drive mode in which at least one of the first and second electric motors, for example, the second electric motor, is used as the vehicle drive power source, with the engine held in the non-operated state. In the differential state of the differential mechanism, the speed of the first electric motor and the speed of the engine are not influenced or governed by the vehicle speed V, that is, by the rotating speed of the power transmitting member, namely, the first electric motor can be freely rotated at a controlled speed so as to zero or substantially zero the engine speed $N_E$. Unlike the non-differential state of the power distributing mechanism, the differential state makes it possible to prevent or reduce the tendency of dragging of the engine held in its non-operated state, and to operate the first electric motor with a high degree of operating efficiency, leading to an improvement in the fuel economy of the vehicle.

(10) The control device according to the above-described mode (9), further comprising hybrid control means operable to control a speed of the first electric motor so as to zero or substantially zero a speed of the engine, when the vehicle in the motor-drive mode. In this case, the first electric motor can be operated in the reverse direction at a speed controlled by the hybrid control means, so as to zero or substantially zero the speed of the engine, in the motor-drive mode of the vehicle, making it possible to minimize the pumping loss and the tendency of dragging of the engine held in its non-operated state, leading to an improvement in the fuel economy of the vehicle.

(11) The control device according to the above-described mode (9) or (10), wherein the engine has a plurality of cylinders at least one of which is selectable as at least one pressure-change restricted cylinder the number of which is variable, the engine being operable in a cylinder-pressure-change restricted state in which a change of a pressure in each of the at least one pressure-change restricted cylinder is restricted, and wherein the hybrid control means controls an operation of the first electric motor so as to improve an operating efficiency of the first electric motor, when the engine is operated in the pressure-change restricted state while the vehicle is in the motor-drive mode. In the pressure-change restricted state of the engine in the motor-drive mode of the vehicle, it is not necessary to prevent the tendency of dragging of the engine 8 due to the pumping loss, so that the operation of the first electric motor can be controlled by the hybrid control means, so as to be operated with an efficiency as high as possible, and so as to improve the fuel economy. In other words, the pumping loss of the engine can be reduced in the pressure-change restricted state (in which a change of the pressure in each of the at least one pressure-change restricted cylinder is restricted), without a need of zeroing or substantially zeroing the engine speed, even when the first electric motor is operated so as to maximize its operating efficiency. Accordingly, the fuel economy of the vehicle can be improved together with an improvement of the operating efficiency of the first electric motor.

(12) The control device according to any one of the above-described modes (9)-(11), further comprising engine-starting requirement determining means for determining whether starting of the engine is required, and wherein the hybrid control means controls an operation of the first electric motor so as to improve an operating efficiency of the first electric motor and to raise a speed of the engine for starting the engine, when the engine-starting requirement determining means has determined that the starting of the engine is required while the vehicle is in the motor-drive mode. In this case, the starting of the engine can be facilitated by the operation of the first electric motor in an operating state suitable for maximizing the operating efficiency, so as to raise the engine speed from zero, under the control of the hybrid control means. Accordingly, the fuel economy is improved.

(13) The control device according to any one of the above-described modes (9)-(12), wherein that the differential portion is placed in a continuously-variable shifting state in which the differential portion is operable as an electrically controlled differential device, when the differential mechanism is switched by the differential-state switching device to the differential state under the control of the differential-state switching means, and is placed in a step-variable shifting state in which the differential portion is not operable as the electrically controlled differential device, when the differential mechanism is switched by the differential-state switching device to the non-differential state under the control of the differential-state switching means. Thus, the differential portion is switchable between the continuously-variable shifting state and the step-variable shifting state.

(14) The control device according to any one of the above-described modes (9)-(13), wherein that the differential mechanism has a first element fixed to the engine, a second element fixed to the first electric motor, and a third element fixed to the power transmitting member, and the differential-state switching device includes at least one coupling device operable to permit the first, second and third elements to be rotatable relative to each other, for thereby placing the differential mechanism in the differential state, and to connect the first, second and third elements to each other for rotation as a unit or hold the second element stationary, for thereby placing the differential mechanism in the non-differential state. Thus, the differential mechanism is switched by the at least one coupling device, between the differential and non-differential states.

(15) The control device according to the above-described mode (14), wherein the at least one coupling device includes a clutch operable to connect selected two of the three elements to each other for rotation of the first, second and third elements as a unit, and/or a brake operable to fix the second element to a stationary element for holding the second element stationary. In this case, the differential mechanism can be easily switched between the differential and non-differential states, by the clutch and brake of the differential-state switching device.

(16) The control device according to the above-described mode (15), wherein the at least one coupling device includes both of the clutch and the brake, which are engaged to place the differential mechanism in the differential state in which the first, second and third elements are rotatable relative to each other, the differential mechanism being operable as a transmission having a speed ratio of 1 while the clutch is engaged, and as a speed-increasing transmission having a speed ratio lower than 1 while the brake is engaged. In this case, the differential mechanism is switchable between the differential and non-differential states, by the clutch and brake of the differential-state switching device, and is operable as a transmission having a single position with a fixed speed ratio, or a plurality of positions having respective fixed speed ratios.

(17) The control device according to any one of the above-described modes (14)-(16), wherein the differential mechanism includes a planetary gear set, and the first, second and third elements are respectively a carrier, a sun gear and a ring gear of the planetary gear set. In this case, the dimension of the differential mechanism in its axial direction can be reduced, and the differential mechanism can be simply constituted by a single planetary gear set.

(18) The control device according to the above-described mode (17), wherein the planetary gear set is of a single pinion type. In this case, the dimension of the differential mechanism in its axial direction can be reduced, and the differential mechanism can be simply constituted by a single planetary gear set of single-pinion type.

(19) The control device according to any one of the above-described modes (9)-(18), wherein an overall speed ratio of the vehicular drive system is determined by a speed ratio of the automatic transmission portion and a speed ratio of the differential portion. In this case, the vehicular drive system provides a vehicle drive force over a wide range of speed ratio, by utilizing the speed ratio of the automatic transmission portion.

(20) The control device according to any one of the above-described modes (9)-(19), wherein the automatic transmission portion is a step-variable automatic transmission. In this case, a continuously variable transmission is constituted by the automatic transmission portion and the differential mechanism placed in its differential state, while a step-variable transmission is constituted by the automatic transmission portion 20 and the differential mechanism placed in its step-variable shifting state.

BRIEF DESCRIPTION OF THE DRAWINGS

The above and other objects, features, advantages and technical and industrial significance of this invention will be better understood from the following detailed description of preferred embodiments of the invention, when considered in connection with the accompanying drawings in which.

DETAILED DESCRIPTION OF THE PREFERRED EMBODIMENTS

Figures 1, 2:
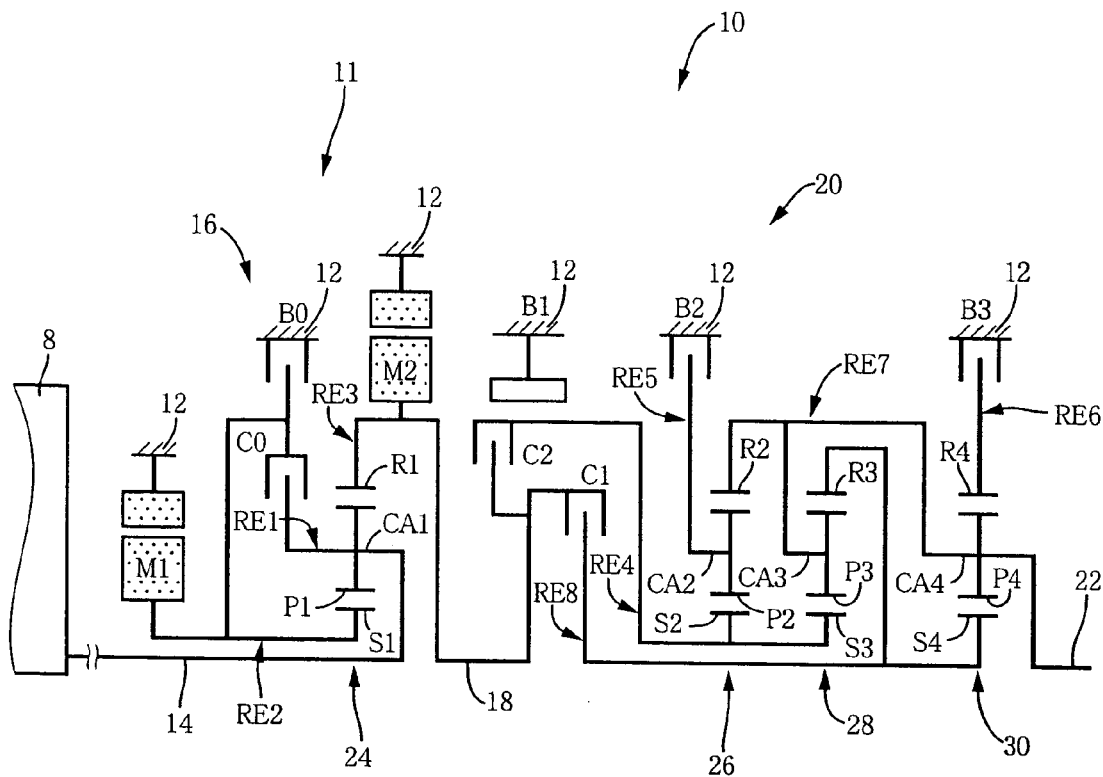
FIG. 1 is a schematic view showing an arrangement of a transmission mechanism of a hybrid vehicle according to one embodiment of the present invention.
FIG. 2 is a table indicating shifting actions of the transmission mechanism of the hybrid vehicle of the embodiment of FIG. 1 operable in a selected one of a continuously-variable shifting state and a step-variable shifting state, in relation to different combinations of operating states of hydraulically operated frictional coupling devices to effect the respective shifting actions.

Referring to the drawings, there will be described in detail the preferred embodiments of the present invention.

First Embodiment

Figure 7:
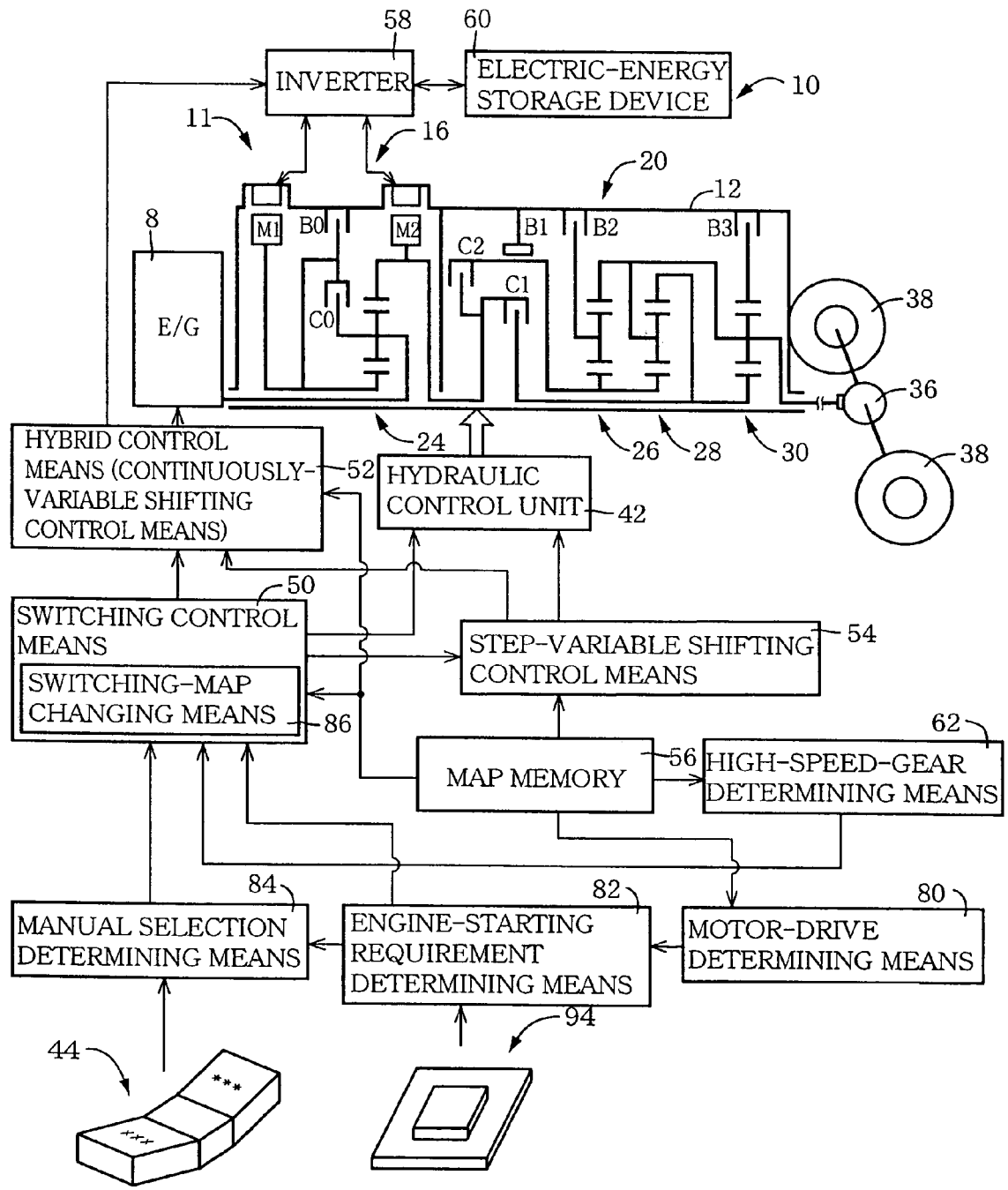
FIG. 7 is a functional block diagram illustrating major control functions performed by the electronic control device of FIG. 6.

Referring first to the schematic view of FIG. 1, there is shown a transmission mechanism 10 which constitutes a part of a transmission mechanism for a hybrid vehicle. The transmission mechanism includes a control device according to one embodiment of this invention. The transmission mechanism 10 shown in FIG. 1 includes: an input rotary member in the form of an input shaft 14 disposed on a common axis in a transmission casing 12 (hereinafter abbreviated as "casing 12") functioning as a stationary member or non-rotary member attached to a body of the vehicle; a differential portion 11 connected to the input shaft 14 either directly, or indirectly via a pulsation absorbing damper (vibration damping device) not shown; a step variable automatic transmission in the form of a step-variable or multiple-step automatic transmission portion 20 (hereinafter referred to simply as "automatic transmission portion 20") disposed in a power transmitting path between the differential portion 11 and drive wheels 38, such that the automatic transmission portion 20 is connected in series to the differential portion 11 and the drive wheels 38 through a power transmitting member (power transmitting shaft) 18; and an output rotary member in the form of an output shaft 22 connected to the automatic transmission portion 20. The input shaft 12, differential portion 11, automatic transmission portion 20 and output shaft 22 are connected in series with each other. This transmission mechanism 10 is suitably used for a transverse FR vehicle (front-engine, rear-drive vehicle), and is disposed between a drive power source in the form of an engine 8 (gasoline or diesel engine) and the pair of drive wheels 38, to transmit a vehicle drive force to the pair of drive wheels 38 through a differential gear device (final speed reduction gear) 36 and a pair of drive axles, as shown in FIG. 7. The differential gear device 36 and the drive axles also constitute a part of the transmission mechanism. In the present transmission mechanism 10, the engine 8 is connected to the differential portion 11, without any fluid-actuated power transmitting device such as a torque converter or a fluid coupling. It is noted that a lower half of the transmission mechanism 10, which is constructed symmetrically with respect to its axis, is omitted in FIG. 1. This is also true in each of the other embodiments described below.

The differential portion 11 includes: a first electric motor M1; a power distributing mechanism 16 functioning as a differential mechanism operable to mechanically distribute the output of the engine 8 transmitted to the input shaft 14, to the first electric motor M1 and the power transmitting member 18; and a second electric motor M2 rotatable with the power transmitting member 18. The second electric motor M2 may be disposed at any position within the power transmitting path between the power transmitting member 18 and the drive wheels 38. In the present embodiment, each of the first electric motor M1 and the second electric motor M2 is a so-called motor/generator functioning as an electric generator as well as an electric motor. The first electric motor M1 should function at least as an electric generator operable to generate an electric energy while generating a reaction force, and the second electric motor M2 should function at least as an electric motor operable to generate a vehicle drive force.

The power distributing mechanism 16 includes, as major components, a first planetary gear set 24 of single pinion type having a gear ratio ρ1 of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which the three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed $N_E$ of the engine 8, namely, in the differential state or continuously-variable shifting state in which the differential portion 11 functions as an electrically controlled continuously variable transmission whose speed ratio γ0 (rotating speed of the input shaft 14/rotating speed of the power transmitting member 18) is continuously variable from a minimum value γ0min to a maximum value γ0max.

When the switching clutch C0 or brake B0 is engaged while the power distributing mechanism 16 is placed in the continuously-variable shifting state, the mechanism 16 is brought into a non-differential state in which the differential function is not available. Described in detail, when the switching clutch C0 is engaged, the first sun gear S1 and the first carrier CA1 are connected together, so that the power distributing mechanism 16 is placed in the locked state or non-differential state in which the three rotary elements of the first planetary gear set 24 consisting of the first sun gear S1, first carrier CA1 and first ring gear R1 are rotatable as a unit. In this non-differential state in which the differential portion 11 is also placed in its non-differential state, the rotating speed $N_E$ of the engine 8 and the rotating speed of the power transmitting member 18 are made equal to each other, so that the differential portion 11 is placed in a fixed-speed-ratio shifting state or a step-variable shifting state in which the differential portion 11 functions as a transmission having a fixed speed ratio γ0 equal to 1. When the switching brake B0 is engaged in place of the switching clutch C0, the first sun gear S1 is fixed to the casing 12, so that the power distributing mechanism 16 is placed in the locked or non-differential state in which the first sun gear S1 is not rotatable, while the differential portion 11 is also placed in a non-differential state. Since the rotating speed of the first ring gear R1 is made higher than that of the first carrier CA1, the differential portion 11 is placed in a fixed-speed-ratio shifting state or a step-variable shifting state in which the differential portion 11 functions as a speed-increasing transmission having a fixed speed ratio γ0 smaller than 1, for example, about 0.7. In the present embodiment described above, the switching clutch C0 and brake B0 function as a differential-state switching device operable to selectively place the differential portion 11 in the continuously-variable shifting state (differential state) in which the differential portion 11 functions as a continuously variable transmission the speed ratio of which is continuously variable, and in the locked state in which the differential portion 11 does not function as the continuously variable transmission, namely, the fixed-speed-ratio shifting state (non-differential state) in which the differential portion 11 functions as a transmission having a single gear position with one speed ratio or a plurality of gear positions with respective speed ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio 65 4 of about 0.421. Where the numbers of teeth of the second sun gear S2, second ring gear R2, third sun gear S3, third ring gear R3, fourth sun gear S4 and fourth ring gear r4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The fourth ring gear R4 is selectively fixed to the casing 12 through a third brake B3, and the second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or second clutch C2 which is engaged to establish gear positions of the automatic transmission portion 20. In other words, the first clutch C1 and the second clutch C22 function as coupling devices which is operable to select one of a power transmitting state and a power disconnecting state of a power transmitting path between the power transmitting member 18 and the automatic transmission portion 20, namely, between the differential portion 11 (power transmitting member 18) and the vehicle drive wheels 38. A rotary motion can be transmitted through the power transmitting path placed in the power transmitting state, and cannot be transmitted through the power transmitting path placed in the power disconnecting state. That is, the power transmitting path is placed in the power transmitting state by engaging at least one of the first and second clutches C1, C2, and is placed in the power disconnecting state by releasing the first or second clutch C1, C2.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are superposed on each other and which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those gear positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0, so that the differential portion 11 can be selectively placed by engagement of the switching clutch C0 or switching brake B0,in the fixed-speed-ratio shifting state in which the differential portion 11 is operable as a transmission having a single gear position with one speed ratio or a plurality of gear positions with respective speed ratios, as well as in the continuously-variable shifting state in which the differential portion 11 is operable as a continuously variable transmission, as described above. In the present transmission mechanism 10, therefore, a step-variable transmission is constituted by the automatic transmission portion 20, and the differential portion 11 which is placed in the fixed-speed-ratio shifting state by engagement of the switching clutch C0 or switching brake B0. Further, a continuously variable transmission is constituted by the automatic transmission portion 20, and the differential portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. The differential portion 11 is also considered to be a transmission switchable between the step-variable shifting state and the continuously-variable shifting state.

Where the transmission mechanism 10 functions as the step-variable transmission, for example, the first-gear position having the highest speed ratio γ1 of about 3.357, for example, is established by engaging actions of the switching clutch C0, first clutch C1 and third brake B3, and the second-gear position having the speed ratio γ2 of about 2.180, for example, which is lower than the speed ratio γ1, is established by engaging actions of the switching clutch C0, first clutch C1 and second brake B2, as indicated in FIG. 2. Further, the third-gear position having the speed ratio γ3 of about 1.427, for example, which is lower than the speed ratio γ2, is established by engaging actions of the switching clutch C0, first clutch C1 and first brake B1, and the fourth-gear position having the speed ratio γ4 of about 1.000, for example, which is lower than the speed ratio γ3, is established by engaging actions of the switching clutch C0, first clutch C1 and second clutch C2. The fifth-gear position having the speed ratio γ5 of about 0705, for example, which is smaller than the speed ratio γ4, is established by engaging actions of the first clutch C1, second clutch C2 and switching brake B0. Further, the reverse-gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C1 and the switching brake B0 are both released, as indicated in FIG. 2, so that the differential portion 11 functions as the continuously variable transmission, while the automatic transmission 10 connected in series to the differential portion 11 functions as the step-variable transmission, whereby the speed of the rotary motion transmitted to the automatic transmission portion 20 placed in one of the first-gear, second-gear, third-gear and fourth-gear positions, namely, the rotating speed of the power transmitting member 18 is continuously changed, so that the speed ratio of the transmission mechanism when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

Figure 3:
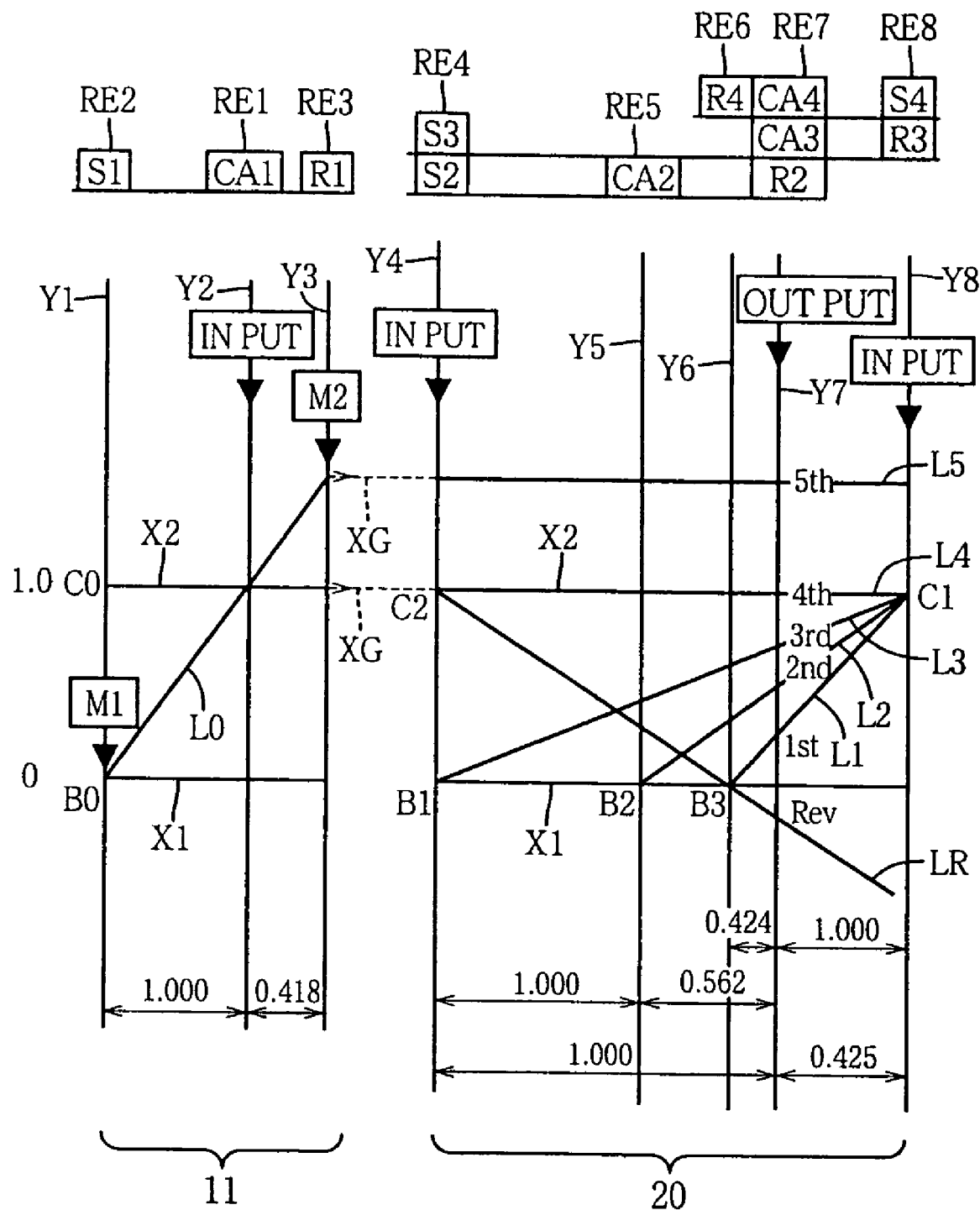
FIG. 3 is a collinear chart indicating relative rotating speeds of rotary elements of the transmission mechanism of the hybrid vehicle of the embodiment of FIG. 1 operated in the step-variable shifting state, in different gear positions of the transmission mechanism.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 correspond to three elements of the power distributing mechanism 16 which constitutes a part of the differential portion 11, and respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio $\rho 1$ of the first planetary gear set 24. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other.

The distances between the adjacent ones of the vertical lines Y4-Y8 are determined by the gear ratios $\rho 2$, $\rho 3$ and $\rho 4$ of the second, third and fourth planetary gear sets 26, 28, 30. For the differential portion 11, therefore, the distance between the vertical lines Y1 and Y2 corresponds to "1", while the distance between the vertical lines Y2 and Y3 corresponds to the gear ratio $\rho 1$. For the automatic transmission portion 20, the distances between the sun gear and carrier of each of the second, third and fourth planetary gear sets 26, 28, 30 corresponds to "1", while the distances between the carrier and ring gear of each of those planetary gear sets 26 28, 30 corresponds to the gear ratio $\rho$.

Referring to the collinear chart of FIG. 3, the power distributing mechanism (continuously variable shifting portion) 16 or differential portion 11 of the transmission mechanism (transmission mechanism) 10 is arranged such that the first rotary element RE1 (first carrier CA1) of the first planetary gear set 24, is integrally fixed to the input shaft 14, that is, to the engine 8, and is selectively connected to the second rotary element RE2 (first sun gear S1) through the switching clutch C0, and this rotary element RE2 is connected to the first electric motor M1 and selectively fixed to the casing 12 through the switching brake B0, while the third rotary element RE3 (first ring gear R1) is fixed to the power transmitting member 18 and connected to the second electric motor M2, so that a rotary motion of the input shaft 14 is transmitted to the automatic transmission (step-variable transmission) 20 through the power transmitting member 18. A relationship between the rotating speeds of the first sun gear S1 and the first ring gear R1 is represented by an inclined straight line L0 which passes a point of intersection between the lines Y2 and X2.

Figure 4:
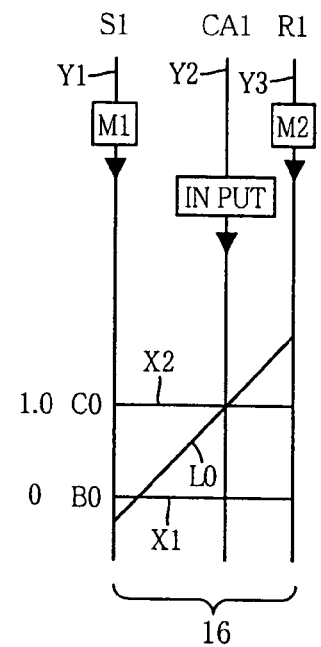
FIG. 4 is a view showing an example of an operating state of a differential portion (power distributing mechanism) of the transmission mechanism placed in the continuously-variable shifting state (differential state), the view corresponding to a part of the collinear chart of FIG. 3 which shows the differential portion.
Figure 5:
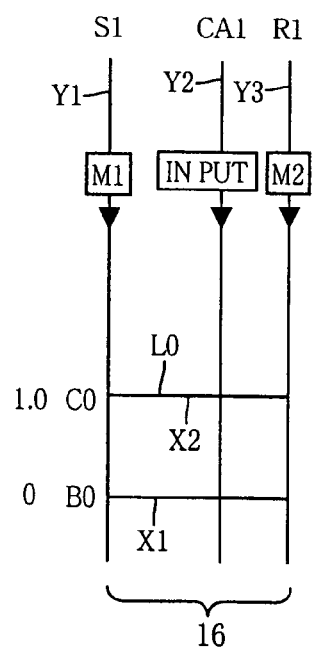
FIG. 5 is a view showing the operating state of the differential portion (power distributing mechanism) placed in the step-variable shifting state (fixed-speed-ratio shifting state or non-differential state) by engagement of a switching clutch C0, the view corresponding to the part of the collinear chart of FIG. 3 which shows the power distributing mechanism.

FIGS. 4 and 5 correspond to a part of the collinear chart of FIG. 3 which shows the differential portion 11. FIG. 4 shows an example of an operating state of the differential portion 11 placed in the continuously-variable shifting state with the switching clutch C0 and the switching brake B0 held in the released state. The rotating speed of the first sun gear S1 represented by the point of intersection between the straight line L0 and vertical line Y1 is raised or lowered by controlling the reaction force generated by an operation of the first electric motor M1 to generate an electric energy, so that the rotating speed of the first ring gear R1 represented by the point of intersection between the lines L0 and Y3 is lowered or raised.

FIG. 5 shows an example of an operating state of the differential portion 11 placed in the fixed-speed-ratio shifting state (step-variable shifting state) with the switching clutch C0 held in the engaged state. When the first sun gear S1 and the first carrier CA1 are connected to each other in this fixed-speed-ratio shifting state, the power distributing mechanism 16 is placed in the non-differential state in which the three rotary elements indicated above are rotated as a unit, so that the straight line L0 is aligned with the horizontal line X2, whereby the power transmitting member 18 is rotated at a speed equal to the engine speed $N_E$. When the switching brake B0 is engaged, on the other hand, the rotation of the power transmitting member 18 is stopped, and the power distributing mechanism 16 is placed in the non-differential state in which the mechanism 16 functions as a speed-increasing device, so that the straight line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second clutch B2, while the sixth rotary element RE6 is selectively fixed to the casing 12 through the third brake B3. The seventh rotary element RE7 is integrally fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first-speed position. The rotating speed of the output shaft 22 in the first-speed position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the output shaft 22 in the second-speed position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third-speed position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth-speed position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first-speed through fourth-speed positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the differential portion 11. The rotating speed of the output shaft 22 in the fifth-speed position established by the engaging actions of the first clutch C1, second clutch C2 and switching brake B9 is represented by a point of intersection between a horizontal line L5 determined by those engaging actions and the vertical line Y7 indicative of the rotating speed of the seventh rotary element RE7 fixed to the output shaft 22.

Figure 6:
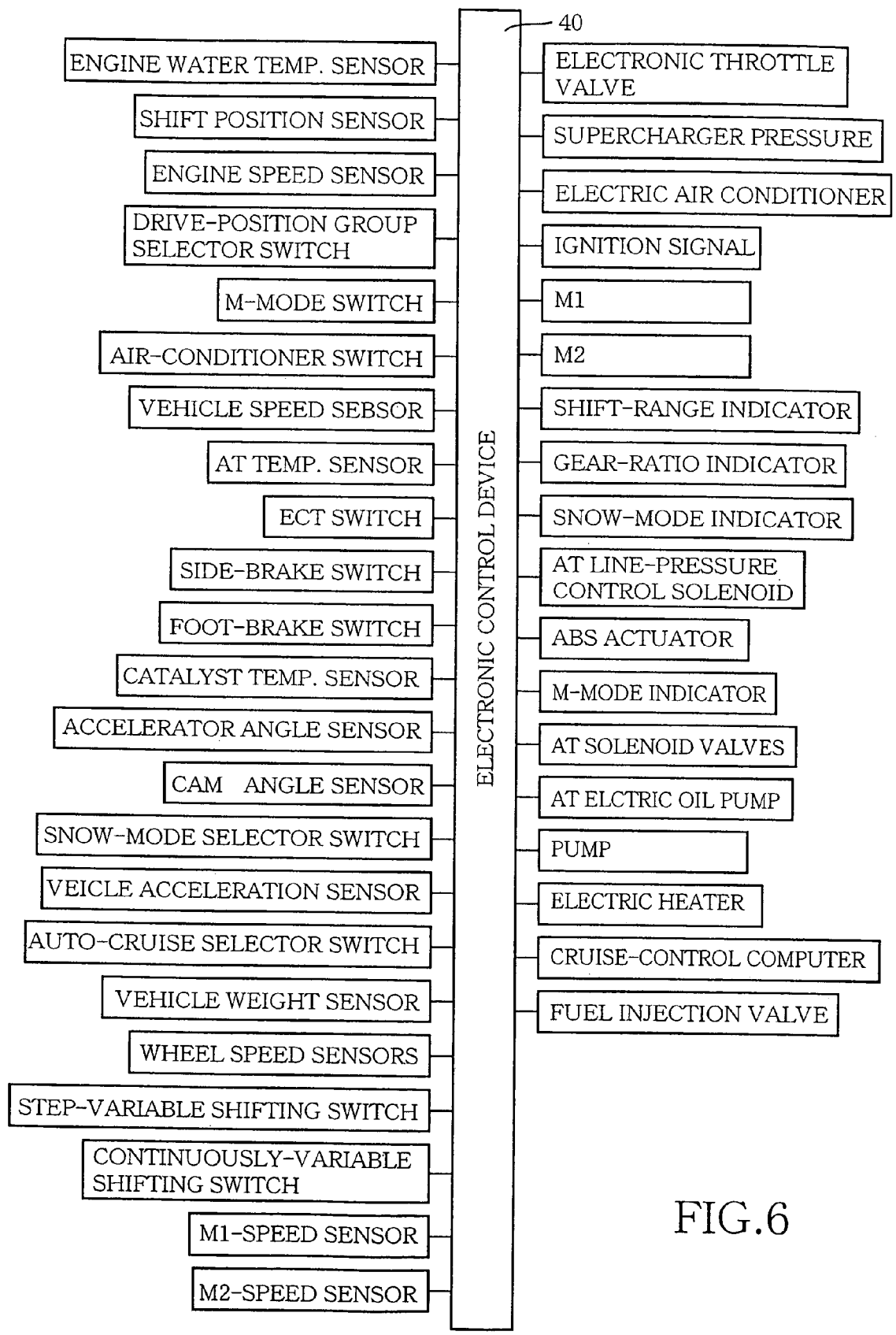
FIG. 6 is a view indicating input and output signals of an electronic control device provided in the transmission mechanism of the embodiment of FIG. 1.

FIG. 6 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as a shifting control of the automatic transmission portion 20.

The electronic control device 40 is arranged to receive, from various sensors and switches shown in FIG. 6, various signals such as: a signal indicative of a temperature of cooling water of the engine; a signal indicative of a selected operating position of a shift lever; a signal indicative of the operating speed $N_E$ of the engine 8; a signal indicative of a value indicating a selected group of forward-drive positions of the transmission mechanism; a signal indicative of an M mode (motor-drive mode); a signal indicative of an operated state of an air conditioner; a signal indicative of a vehicle speed corresponding to the rotating speed of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an angle of operation Acc of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 in the fixed-speed-ratio shifting state (non-differential state) in which the transmission mechanism 10 functions as a step-variable transmission; a signal indicative of a continuously-variable shifting switch provided to place the differential portion 11 in the continuously variable-shifting state in which the transmission mechanism 10 functions as the continuously variable transmission; a signal indicative of a rotating speed $N_{M1}$ of the first electric motor M1; a signal indicative of a rotating speed $N_{M2}$ of the second electric motor M2; a signal indicative of an amount of an electric current generated by the first electric motor M1; a signal indicative of an amount of an electric current generated by the second electric motor; a signal indicative of an amount of a driving current applied to the first electric motor M1; a signal indicative of an amount of a driving electric current applied to the second electric motor M2; a signal indicative of an amount of a control electric current applied to the first electric motor M1; a signal indicative of an amount of a control current applied to the second electric motor M2; and an electric energy amount SOC stored in an electric-energy storage device 60.

The electronic control device 40 is further arranged to generate various signals such as: a signal to drive an electronic throttle actuator for controlling an angle of opening of a throttle valve; a signal to adjust a pressure of a supercharger; a signal to operate the electric air conditioner; a signal for controlling an ignition timing of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the differential portion 11 and the automatic transmission portion 20; a signal to operate an electric oil pump used as a hydraulic pressure source for the hydraulic control unit 42; a signal to drive an electric heater; a signal to be applied to a cruise-control computer; and a signal to control a fuel injection valve for controlling an mount of a fuel to be injected into the engine 8.

FIG. 7 is a functional block diagram illustrating major control functions performed by the electronic control device 40. The electronic control device 40 includes switching control means 50, hybrid control means 52, step-variable shifting control means 54, a map memory 56, high-speed-gear determining means 62, motor-drive determining means 80, engine-starting requirement determining means 82 and manual selection determining means 84. The step-variable shifting control means 54 is arranged to determine whether a shifting action of the automatic transmission portion 20 should take place, and control an automatic shifting control of the automatic transmission portion 20 according to a result of the determination. This determination is made on the basis of the actual condition of the vehicle represented by a running speed V and an output torque $T_{OUT}$ of the automatic transmission portion 20, and according to a shifting boundary line map (shifting map) which is stored in the map memory 56 and which is indicated by solid and one-dot chain lines in FIG. 8.

In the continuously-variable shifting state of the transmission mechanism 10, that is, in the differential-state of the differential portion 11, the hybrid control means 52 controls the engine 8 to be operated with high efficiency, and controls the first electric motor M1 and the second electric motor M2, so as to establish an optimum proportion of the drive forces which are produced by the engine 8, and the second electric motor M2, and so as to optimize the reaction force generated by the first electric motor M1 during its operation as an electric generator. For instance, the hybrid control means 52 calculates the output as required by the vehicle operator at the present running speed V of the vehicle, on the basis of the operating amount Acc of the accelerator pedal and the vehicle running speed V, and calculate a required vehicle drive force on the basis of the calculated required output and a required amount of generation of an electric energy by the first electric motor M1. On the basis of the calculated required vehicle drive force, the hybrid control means 52 calculates desired total output and speed $N_E$ of the engine 8, and controls the actual output of the engine 8 and the amount of generation of the electric energy by the first electric motor M1, according to the calculated desired total output and speed of the engine. The hybrid control means 52 can control the engine speed $N_E$ for the same vehicle speed and for the same speed ratio of the automatic transmission portion 20 (for the same rotating speed of the power transmitting member 18), by controlling the amount of generation of an electric energy by the first electric motor M1.

The hybrid control means 52 is arranged to effect the above-described hybrid control while taking account of the presently selected gear position of the automatic transmission portion 20, so as to improve the fuel economy of the engine 8. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the automatic transmission portion 20. That is, the hybrid control means 52 determines a target value of the overall speed ratio γT of the transmission mechanism 10 so that the engine 8 is operated according a stored highest-fuel-economy curve that satisfies both of the desired operating efficiency and the highest fuel economy of the engine 8. The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to the electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied from the first electric motor M1 to the second electric motor M2 through the inverter 58 and consumed by the second electric motor M2, or supplied from the first electric motor M1 to the electric-energy storage device 60 through the inverter 58 and subsequently consumed by the first electric motor M1. A drive force produced by an operation of the second electric motor M1 or first electric motor M1 with the electric energy generated by the first electric motor M1 is transmitted to the power transmitting member 18. Thus, the transmission mechanism 10 is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2. It is noted that the hybrid control means 52 is further arranged to establish the motor-drive mode in which the vehicle is driven with only the electric motor (e.g., second electric motor M2) used as the drive power source, by utilizing the electric CVT function (differential function) of the differential portion 11, irrespective of whether the engine 8 is in the non-operated state or in the idling state. The hybrid control means 52 can establish the motor-drive mode to drive the vehicle with only the first electric motor M1 and/or the second electric motor M2, even when the engine 8 is in the non-operated state while the differential portion 11 is placed in the step-variable shifting state (fixed-speed-ratio shifting state).

Figure 9:
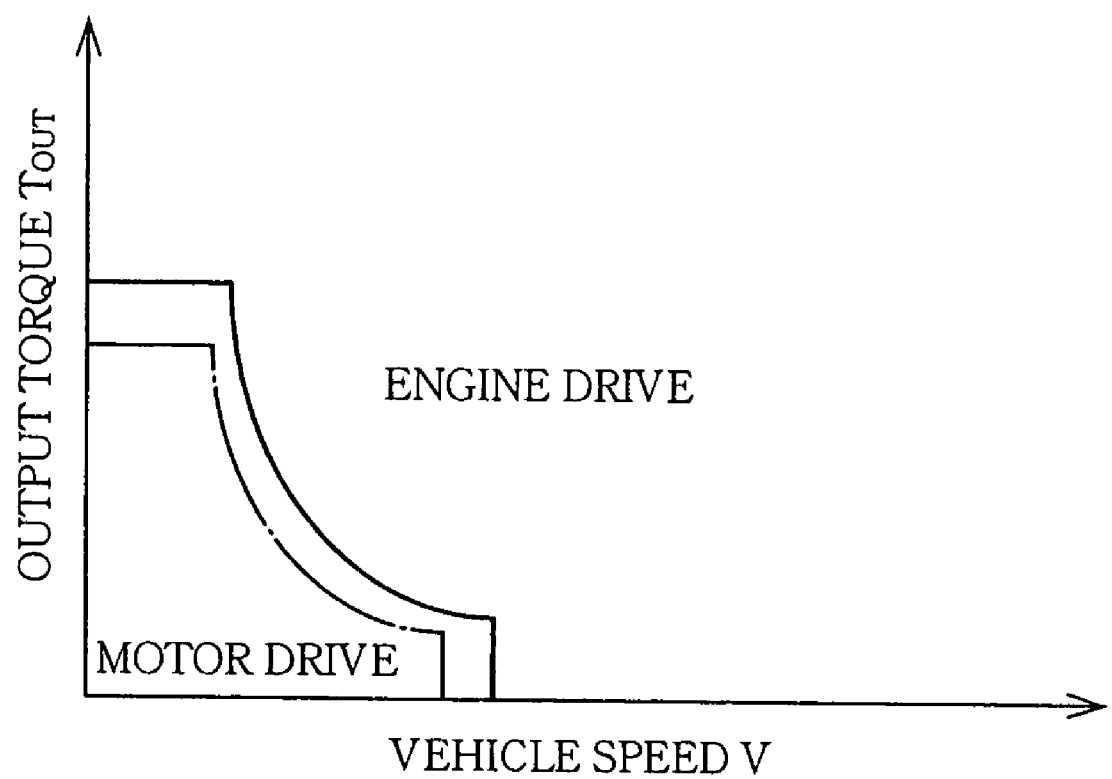
FIG. 9 is a view indicating an example of a stored drive-power-source switching boundary line map representative of boundary lines defining an engine-drive region and a motor-drive region which are used to select a drive power source, the boundary line map being defined in a two-dimensional coordinate system having an axis of the vehicle speed and an axis of the output torque of the automatic transmission portion.

FIG. 9 shows an example of a stored relationship, namely, a boundary line which defines an engine-drive region and a motor-drive region and which is used to select the engine 8 or the electric motors M1, M2, as the drive power source (to select one of the engine-drive mode and the motor-drive mode). That is, the stored relationship is represented by a drive-power-source switching boundary line map (drive-power-source switching map) in a rectangular two-dimensional coordinate system having an axis along which the vehicle speed V is taken, and an axis along which the drive-force-related value in the form of the output torque $T_{OUT}$ is taken. The vehicle speed V and the output torque $T_{OUT}$ are used as control parameters to select the drive power source. FIG. 9 also shows a one-dot chain line which is located inside the solid boundary line, by a suitable amount of control hysteresis. The two boundary lines indicated by the respective solid and one-dot chain lines are selectively used depending upon whether the drive mode is changed from the engine-drive mode to the motor-drive mode or from the motor-drive mode to the engine-drive mode. For example, the drive-power-source switching boundary line map shown in FIG. 9 is stored in the map memory 56. The hybrid control means 52 determines whether the vehicle condition represented by the vehicle speed V and the output torque $T_{OUT}$ is in the motor-drive region defined by the drive-power-source switching boundary line map. As is apparent from FIG. 9, the hybrid control means 52 selects the motor-drive mode when the output torque $T_{OUT}$ is comparatively small, or when the vehicle speed V is comparatively low, that is, when the vehicle load is in a comparatively low range in which the operating efficiency of the engine 8 is generally lower than in a comparatively high range.

Figure 10:
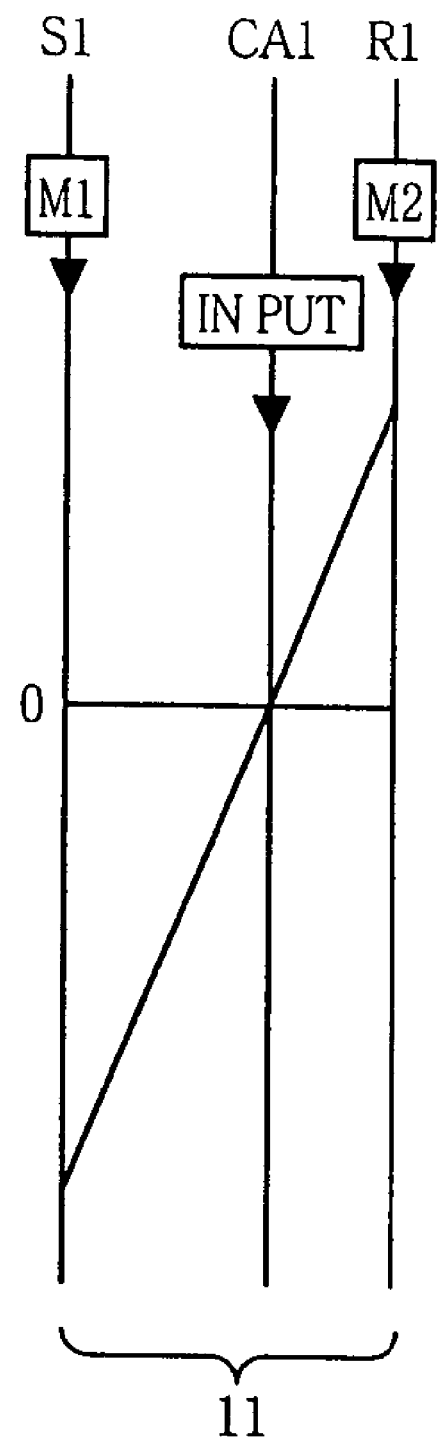
FIG. 10 is a view corresponding to a part of the collinear chart of FIG. 3 which shows the differential portion, indicating an operating state of the differential portion in the continuously-variable shifting state, in which the engine speed is substantially zero in the motor drive mode.

For reducing a tendency of dragging of the engine 8 held in its non-operated state in the motor-drive mode, for thereby improving the fuel economy, the hybrid control means 52 controls the differential portion 11 so that the engine speed $N_E$ is held substantially zero, that is, held zero or close to zero, with the differential function of the differential portion 11. The dragging of the engine 8 is defined as generation of a resistance to reciprocating movement of the pistons (a resistance to rotating motion of the crankshaft) FIG. 10 is a view corresponding to a portion of the collinear chart of FIG. 3 which shows the differential portion 11. The collinear chart of FIG. 10 indicates an example of the operating state of the differential portion 11 placed in its continuously-variable shifting state, in the motor-drive mode of the vehicle. Where the vehicle is run with the output torque of the second electric motor M2, the first electric motor M1 is freely rotated in the negative direction so that the engine speed $N_E$ (rotating speed of the first carrier CA1) is held substantially zero while the second electric motor M2 is operated at a speed corresponding to the vehicle speed V.

Referring back to FIG. 7, the high-speed-gear determining means 62 is arranged to determine whether the gear position to which the transmission mechanism 10 should be shifted is the high-gear position, for example, the fifth-gear position. This determination is made on the basis of the vehicle condition and according to a shifting boundary line map of FIG. 8 stored in the map memory 56, for example, to determine one of the switching clutch C0 and brake B0 that should be engaged, to place the transmission mechanism 10 in the step-variable shifting state.

The switching control means 50 is arranged to determine whether the vehicle condition represented by the vehicle speed V and the output torque $T_{OUT}$ is in a step-variable shifting region for placing the transmission mechanism 10 in the step-variable shifting state, or in a continuously-variable shifting region for placing the transmission mechanism 10 in the continuously-variable shifting state. This determination is made according to a switching boundary line map (switching map or relationship) which is indicated by solid and two-dot chain lines in FIG. 8 and which is stored in the map memory 56. Thus, the transmission mechanism 10 is placed selectively in one of the step-variable and continuously-variable shifting states, on the basis of the vehicle condition and according to the switching boundary line map.

When the switching control means 50 determines that the vehicle condition is in the continuously-variable shifting region, the switching control means 50 disables the hybrid control means 52 effect a hybrid control or continuously-variable shifting control, and enables the step-variable shifting control means 54 to effect a predetermined step-variable shifting control. In this case, the step-variable shifting control means 54 effects an automatic shifting control according to the shifting boundary line map of FIG. 8 stored in the map memory 56. FIG. 2 indicates the combinations of the operating states of the hydraulically operated frictional coupling devices C0, C1, C2, B0, B1, B2 and B3, which are selectively engaged for effecting the step-variable shifting control. In this automatic step-variable shifting control mode, the transmission mechanism 10 as a whole consisting of the differential portion 11 and the automatic transmission portion 20 functions as a so-called "step-variable automatic transmission", the gear positions of which are established according to the table of engagement of the frictional coupling devices shown in FIG. 2.

When the high-speed-gear determining means 62 determines that the fifth-gear position should be established as the high-gear position, the switching control means 50 commands the hydraulic control unit 42 to release the switching clutch C0 and engage the switch brake B0, so that the differential portion 11 functions as an auxiliary transmission having a fixed speed ratio γ0, for example, a speed ratio γ0 of 0.7, whereby the transmission mechanism 10 as a whole is placed in a so-called "overdrive gear position" having a speed ratio lower than 1.0. When the high-speed-gear determining means 62 determines that a gear position other than the fifth-gear position should be established, the switching control means 50 commands the hydraulic control unit 42 to engage the switching clutch C0 and release the switching brake B0, so that the differential portion 11 functions as an auxiliary transmission having a fixed speed ratio 70, for example, a speed ratio γ0 of 1, whereby the transmission mechanism 10 as a whole is placed in a low-gear position the speed ratio of which is not lower than 1.0. Thus, the transmission mechanism 10 is switched to the step-variable shifting state, by the switching control means 50, and the differential portion 11 placed in the step-variable shifting state is selectively placed in one of the two gear positions, so that the differential portion 11 functions as the auxiliary transmission, while at the same time the automatic transmission portion 20 connected in series to the differential portion 11 functions as the step-variable transmission, whereby the transmission mechanism 10 as a whole functions as the so-called "step-variable automatic transmission".

When the switching control means 50 determines that the vehicle condition is in the continuously-variable shifting region for placing the transmission mechanism 10 in the continuously-variable shifting state, on the other hand, the switching control means 50 commands the hydraulic control unit 42 to release both of the switching clutch C0 and the switching brake B0 for placing the differential portion 11 in the continuously-variable shifting state, so that the transmission mechanism 10 as a whole is placed in the continuously-variable shifting state. At the same time, the switching control means 50 enables the hybrid control means 52 to effect the hybrid control, and commands the step-variable shifting control means 54 to select and hold a predetermined one of the gear positions, or to permit an automatic shifting control according to the shifting boundary line map of FIG. 8 stored in the map memory 56. In the latter case, the variable-step shifting control means 54 effects the automatic shifting control by suitably selecting the combinations of the operating states of the frictional coupling devices indicated in the table of FIG. 2, except the combinations including the engagement of the switching clutch C0 and brake B0. Thus, the differential portion 11 placed in the continuously-variable shifting state under the control of the switching control means 50 functions as the continuously variable transmission while the automatic transmission portion 20 connected in series to the differential portion 11 functions as the step-variable transmission, so that the transmission mechanism provides a sufficient vehicle drive force, such that the speed of the rotary motion transmitted to the automatic transmission portion 20 placed in one of the first-speed, second-speed, third-speed and fourth-gear positions, namely, the rotating speed of the power transmitting member 18 is continuously changed, so that the speed ratio of the transmission mechanism when the automatic transmission portion 20 is placed in one of those gear positions is continuously variable over a predetermined range. Accordingly, the speed ratio of the automatic transmission portion 20 is continuously variable through the adjacent gear positions, whereby the overall speed ratio γT of the transmission mechanism 10 as a whole is continuously variable.

Figure 8:
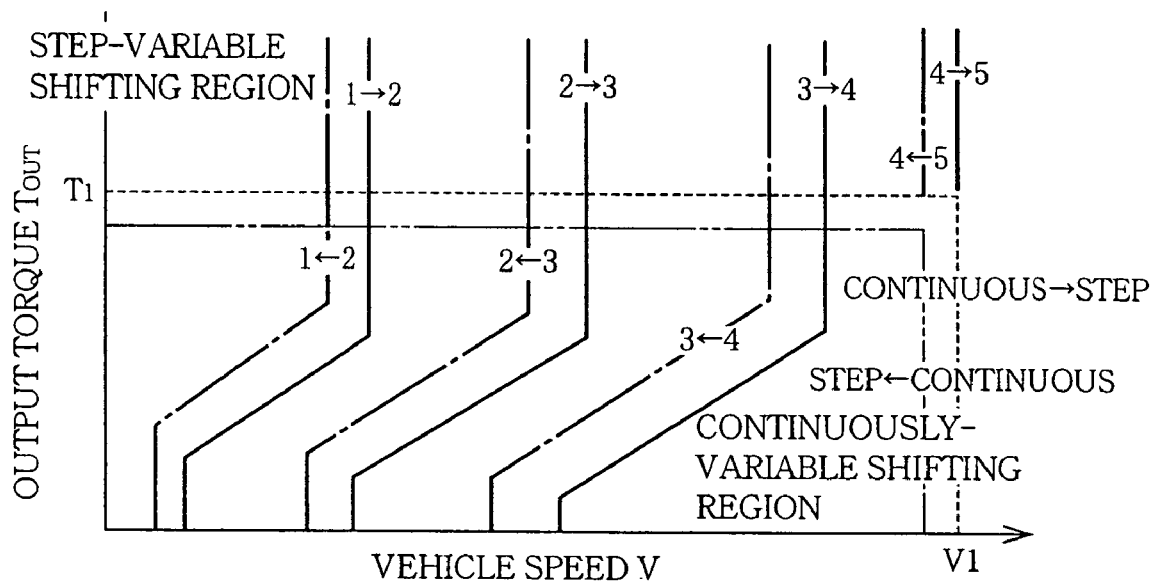
FIG. 8 is a view indicating an example of a stored shifting boundary line map used to control a shifting action of a step-variable automatic transmission portion of the transmission mechanism, and an example of a stored switching boundary line map used to place the differential portion in a selected one of the continuously-variable and step-variable shifting states, the boundary line maps being defined in a two-dimensional coordinate system having an axis of a vehicle speed and an axis of an output torque of the automatic transmission portion.

Referring to FIG. 8, there will be described in detail the shifting boundary line map (shifting map or relationship) and the switching boundary line map (switching map or relationship), which are used to automatically shift the automatic transmission portion 20. The shifting boundary line map, which is stored in the map memory 56, consists of shifting boundary lines in a rectangular two-dimensional coordinate system having an axis along which the vehicle speed V is taken, and an axis along which the drive-force-related value in the form of the output torque $T_{OUT}$ of the automatic transmission portion 20 is taken. In FIG. 8, the solid lines are shift-up boundary lines, and one-dot chain lines are shift-down boundary lines. The switching boundary line map consists of switching boundary lines, which are indicated by broken lines in FIG. 12. These switching boundary lines define the above-described step-variable shifting region and continuously-variable shifting region, which are used by the switching control means 50 to switch the differential portion 11 between the step-variable and continuously-variable shifting states. The switching boundary lines represent the upper vehicle-speed limit V1 and the upper output-torque limit T1 above which it is determined that the vehicle is in the high-speed or high-output running state. FIG. 8 also shows two-dot chain lines which are switching boundary line offset with respect to the broken lines, by a suitable amount of control hysteresis, so that the broken lines and the two-dot chain lines are selectively used as the switching boundary lines, depending upon whether the shifting state is changed from the continuously-variable shifting state to the step-variable shifting state, or from the step-variable shifting state to the continuously-variable shifting state. The switching boundary map is used to place the differential portion 11 (transmission mechanism 10) selectively in one of the step-variable shifting state and the continuously-variable shifting state, depending upon whether the vehicle speed V and the output torque $T_{OUT}$ are higher than the predetermined upper limit values V, T1. This switching boundary line map as well as the shifting boundary line map may be stored in the map memory 56. The switching boundary line map may include at least one of the boundary lines representative of the upper vehicle-speed limit V1 and the upper output-torque limit T1, and may use only one of the two parameters V and $T_{OUT}$. The shifting boundary line map and the switching boundary line may be replaced by stored equations for comparison of the actual vehicle speed V with the limit value V1 and comparison of the actual output torque $T_{OUT}$ with the limit value T1.

The drive-force-related value indicated above is a parameter corresponding to the drive force of the vehicle, which may be an output torque $T_{OUT}$ of the automatic transmission portion 20, an engine output torque $T_E$ or an acceleration value of the vehicle, as well as a drive torque or drive force of drive wheels 38. The engine output torque $T_E$ may be an actual value calculated on the basis of the operating angle of the accelerator pedal or the opening angle of the throttle valve (or intake air quantity, air/fuel ratio or amount of fuel injection) and the engine speed $N_E$, or an estimated value of the required vehicle drive force which is calculated on the basis of the amount of operation of the accelerator pedal by the vehicle operator or the operating angle of the throttle valve. The vehicle drive torque may be calculated on the basis of not only the output torque $T_{OUT}$, etc., but also the ratio of a differential gear device of and the radius of the drive wheels 38, or may be directly detected by a torque sensor or the like.

For instance, the upper vehicle-speed limit V1 of the vehicle speed is determined so that the transmission mechanism 10 is placed in the step-variable shifting state while the vehicle speed V is higher than the limit V1. This determination is effective to minimize a possibility of deterioration of the fuel economy of the vehicle if the transmission mechanism 10 were placed in the continuously-variable shifting state at a relatively high running speed of the vehicle. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 11:
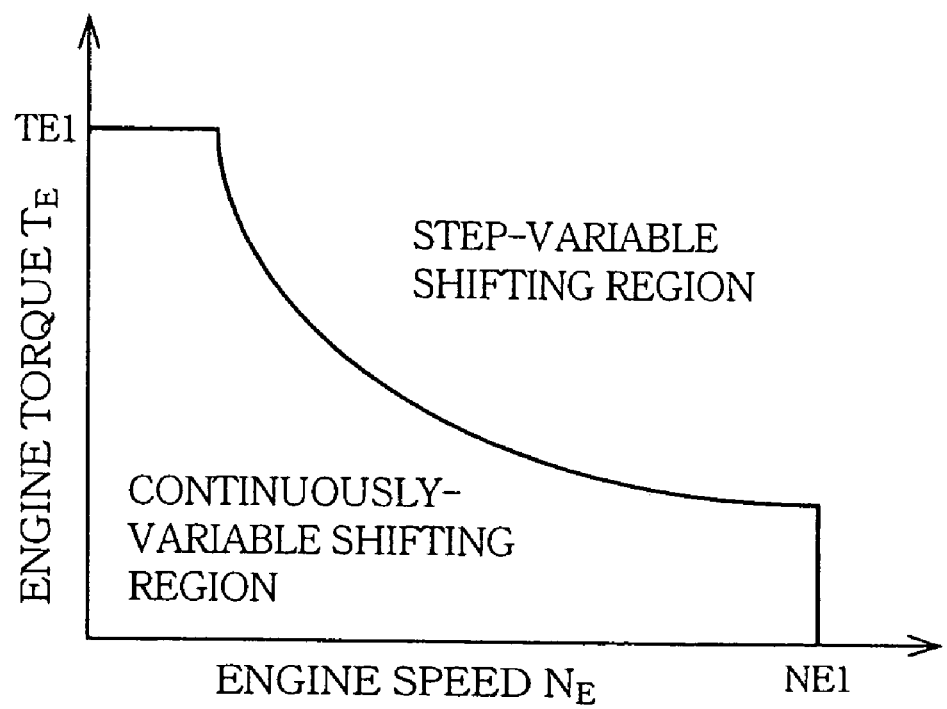
FIG. 11 is a view indicating a stored switching boundary line map representative of switching boundary lines defining the continuously-variable shifting region and the step-variable shifting region, the switching boundary line map being used to generate the switching boundary lines indicated by broken lines in FIG. 8.

FIG. 11 shows the switching boundary line map (switching map or relationship) which is stored in the map memory 56 and which has the switching boundary lines in the form of engine output lines defining the step-variable shifting region and the continuously-variable shifting region one of which is selected by the switching control means 50 on the basis of control parameters consisting of the engine speed $N_E$ and engine torque $T_E$. The switching control means 50 may use the switching boundary line map of FIG. 11 in place of the switching boundary line map of FIG. 8, to determine whether the vehicle condition represented by the engine speed $N_E$ and engine torque $T_E$ is in the continuously-variable shifting region or in the step-variable shifting region. The broken lines in FIG. 8 can be generated on the basis of the switching boundary line map of FIG. 11. In other words, the broken lines of FIG. 8 are switching boundary lines which are defined on the basis of the switching boundary line map of FIG. 11, in the rectangular two-dimensional coordinate system having an axis of the vehicle speed V and an axis of the output torque $T_{OUT}$.

As shown in FIG. 8, the step-variable shifting region is set to be a high output-torque region in which the output torque $T_{OUT}$ is not lower than the upper output-torque limit T1, and a high vehicle-speed region in which the vehicle speed V is not lower than the upper vehicle-speed limit V1. Accordingly, the step-variable shifting control is effected when the vehicle is in a high-output running state with a comparatively high output of the engine 8 or when the vehicle is in a high-speed running state, while the continuously-variable shifting control is effected when the vehicle is in a low-output running state with a comparatively low output of the engine 8 or when the vehicle is in a low-speed running state, that is, when the engine 8 is in a normal output state. Similarly, the step-variable shifting region indicated in FIG. 11 is set to be a high-torque region in which the engine output torque $T_E$ is not lower than a predetermined value $T_{E1}$, a high-speed region in which the engine speed $N_E$ is not lower than a predetermined value $N_{E1}$, or a high-output region in which the engine output determined by the output torque $T_E$ and speed $N_E$ of the engine 8 is not lower than a predetermined value. Accordingly, the step-variable shifting control is effected when the torque, speed or output of the engine 8 is comparatively high, while the continuously-variable shifting control is effected when the torque, speed or output of the engine is comparatively low, that is, when the engine is in a normal output state. The switching boundary lines in FIG. 11, which defines the step-variable shifting region and the continuously-variable shifting region, function as an upper vehicle-speed limit line consisting of a series of upper vehicle-speed limits, and an upper output limit line consisting of a series of upper output limits.

Figure 12:
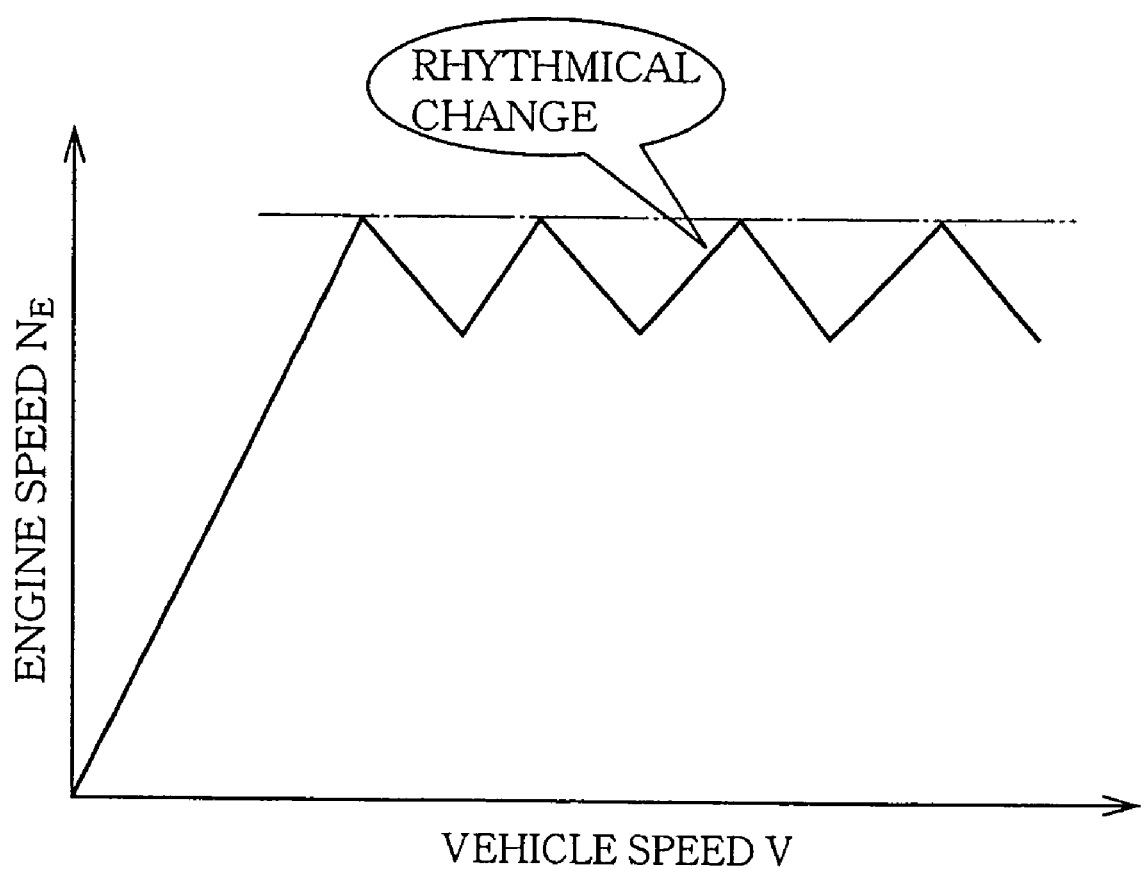
FIG. 12 is a view indicating an example of a change of the engine sped as a result of a shift-up action of the automatic transmission portion.

Therefore, when the vehicle is in a low- or medium-speed running state or in a low- or medium-output running state, the transmission mechanism 10 is placed in the continuously-variable shifting state, assuring a high degree of fuel economy of the vehicle. When the vehicle is in a high-speed running state with the vehicle speed V exceeding the upper vehicle-speed limit V1, on the other hand, the transmission mechanism 10 is placed in the step-variable shifting in which the transmission mechanism 10 is operated as a step-variable transmission, and the output of the engine 8 is transmitted to the drive wheels 38 primarily through the mechanical power transmitting path, so that the fuel economy is improved owing to reduction of a loss of conversion of the mechanical energy into the electric energy, which would take place when the transmission mechanism 10 is operated as an electrically controlled continuously variable transmission. When the vehicle is in a high-output running state in which the drive-force-related value in the form of the output torque $T_{OUT}$ exceeds the upper output-torque limit T1, the transmission mechanism 10 is also placed in the step-variable shifting state. Therefore, the transmission mechanism 10 is placed in the continuously-variable shifting state or operated as the electrically controlled continuously variable transmission, only when the vehicle speed is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1, and the required size of the transmission mechanism including the electric motor. In other words, the transmission mechanism 10 is switched from the continuously-variable shifting state to the step-variable shifting state (fixed-speed-ratio shifting state) in the high-output running state of the vehicle in which the vehicle operator desires an increase of the vehicle drive force, rather than an improvement in the fuel economy. Accordingly, the vehicle operator is satisfied with a change of the engine speed $N_E$ as a result of a shift-up action of the automatic transmission portion in the step-variable shifting state, that is, a comfortable rhythmic change of the engine speed $N_E$, as indicated in FIG. 12.

Figure 13:
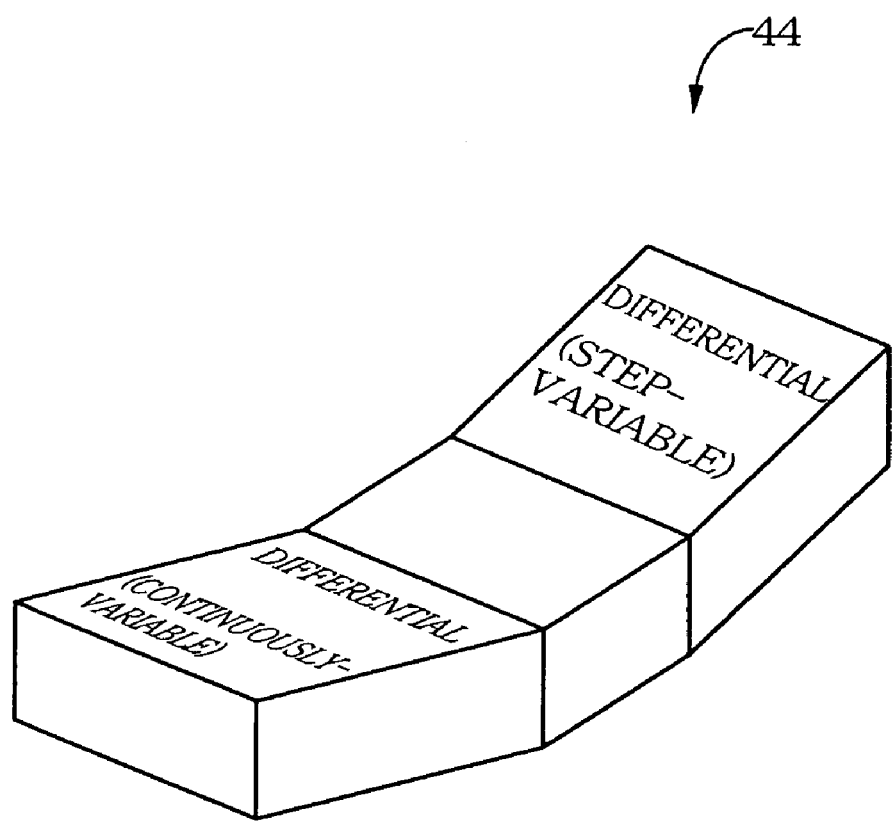
FIG. 13 is a view showing an example of a manually operable shifting-state selecting device in the form of a seesaw switch, which is used to select the shifting state of the differential portion.

FIG. 13 shows a seesaw type switch 44 functioning as a manually operable shifting-state selecting device manually operable to select a desired one of the differential state and the non-differential state of the power distributing mechanism 16, that is, to select a desired one of the continuously-variable shifting state and the step-variable shifting state. To select the continuously-variable shifting state, the vehicle operator presses the switch 44 at its portion labeled "DIFFERENTIAL (CONTINUOUS)". To select the step-variable shifting state, the vehicle operator presses the switch at its portion labeled "LOCK (STEP-VARIABLE)". Thus, the switch 44 permits the vehicle operator to place the transmission mechanism 10 in the continuously-variable shifting state in which the transmission mechanism 10 is operable as an electrically controlled continuously variable transmission, or in the step-variable shifting state in which the transmission mechanism 10 is operable as a step-variable transmission. For instance, the vehicle operator operates the switch 44 to place the transmission mechanism 10 in the continuously-variable shifting state when the operator likes the transmission mechanism 10 to operate as a continuously variable transmission or wants to improve the fuel economy of the engine, or alternatively in the step-variable shifting state when the operator likes a change of the engine speed as a result of a shifting action of the transmission mechanism 10 operating as a step-variable transmission.

Referring back to the block diagram of FIG. 7, the manual selection determining means 84 is arranged to determine whether the power distributing mechanism 16 is placed in the differential-state or in the non-differential state, that is, whether the transmission mechanism 10 is placed in the continuously-variable shifting state or in the step-variable shifting state. This determination is made depending upon the output of the switch 44.

The switching control means 50 includes switching-map changing means 86, which is arranged to place the transmission mechanism 10 in the continuously-variable or step-variable shifting state which has been selected by a manual operation of the switch 44. That is, the switching-map changing means 86 determines the selected shifting state of the transmission mechanism 10, on the basis of a result of the determination by the manual selection determining means 84 as to whether the switch 44 has been operated to select the continuously-variable or step-variable shifting state. The switching-map changing means 86 is further arranged to change the switching boundary line map of FIG. 8, that is, to change the switching boundary lines defining the step-variable and continuously-variable shifting states.

Described in detail, upon determination by the manual selection determining means 84 that the continuously-variable or step-variable shifting state has been selected by the switch 44, the switching-map changing means 86 is operated to change the switching boundary line map such that one of the continuously-variable and step-variable shifting regions which corresponds to the shifting state not selected by the switch 44 is changed to the other shifting region, so that the shifting region corresponding to the selected shifting state covers the entire region of the vehicle condition. Accordingly, the boundary lines indicated by the broken and one-dot chain lines are deleted, and only one of the continuously-variable and step-variable shifting regions is represented by the changed switching map. Thus, the switching control means 50 places the transmission mechanism 10 in the selected one of the continuously-variable and step-variable shifting states, according to the changed switching map.

However, the switching control means 50 automatically switches the shifting state of the transmission mechanism 10 between the continuously-variable and step-variable shifting states, on the basis of the vehicle condition and according to the original switching boundary line map of FIG. 8, when neither the continuously-variable shifting state nor the step-variable shifting state is selected by the switch 44, or when the switch 44 is placed in its neutral position.

The motor-drive determining means 80 is arranged to determine whether the vehicle is in the motor-drive mode in which only the second electric motor M2, for example, is used as the vehicle drive source while the engine 8 is in the non-operated state. This determination is made on the basis of the vehicle condition represented by the vehicle speed V and the output torque $T_{OUT}$ and according to the drive-power-source switching boundary line map of FIG. 9.

The engine-starting requirement determining means 82 is arranged to determine whether the starting of the engine 8 is required in the motor-drive mode. For instance, this determination is made on the basis of an output of a drive-mode selector switch 94, which is provided to manually select a desired drive mode. That is, the engine-starting requirement determining means 82 may be arranged to determine that the starting of the engine 8 is required, when the drive-mode selector switch 94 has been operated to select a power drive mode. The selector switch may be a seesaw switch similar to the switch 44, a pushbutton switch or a lever type switch, and is arranged to permit the selection of at least the power-drive mode. The power drive mode is a running mode of the vehicle in which the vehicle is driven with a higher degree of drivability or a larger drive force, than in a normal drive mode. In the power drive mode, the automatic shifting action of the automatic transmission portion 20 is controlled according to a power-mode shifting boundary line map the boundary lines of which are determined such that shift-up actions of the automatic transmission portion 20 take place at higher vehicle speeds according to the power-mode shifting boundary line map, than according to the normal-mode shifting boundary line map of FIG. 8. Alternatively, the drive power source is selected according to a power-mode drive-power-source switching boundary line map, in the power drive mode. The boundary lines of the power-mode switching boundary line map are determined such that the engine-drive mode is selected in a lower-load region of the vehicle condition, at lower vehicle speeds or at lower output torque values $T_{OUT}$ according to the power-mode drive-power-source switching boundary line map, than according to the normal-mode drive-power-source switching boundary line map of FIG. 9. When the power drive mode is selected by the drive-mode selector switch 94, therefore, the required vehicle drive torque is increased, or the switching of the drive mode to the engine-drive mode is required in a lower load condition of the vehicle, so that the engine 8 is required to the started. The starting of the engine 8 is required not only when the power drive mode is selected, but also when the required drive torque of the drive wheels 38 is larger than the nominal output of the second electric motor M2, for instance, when the accelerator pedal is depressed for rapid acceleration of the vehicle or for running of the vehicle on an uphill roadway, when the first electric motor M1 is required to be operated as an electric generator to charge the electric-energy storage device 60 due to reduction of an electric energy amount SOC stored therein below a lower limit, or when optional devices such as an air conditioner provided on the vehicle are operated with an electric energy.

Then, the control operation of the switching control means 50 will be described in detail. When the motor-drive determining means 80 determines that the vehicle is in the motor-drive mode, the switching control means 50 switches the power distributing mechanism 16 to the differential state, so that the engine speed $N_E$ is held substantially zero, as indicated in FIG. 10, for the purpose of preventing or reducing a tendency of dragging of the engine 8 in its non-operated state, for thereby improving the fuel economy.

The switching control means 50 is further arranged to switch the power distributing mechanism 16 to the differential state or continuously-variable shifting state, during running of the vehicle in the motor-drive mode, even when the non-differential state or step-variable shifting state of the power distributing mechanism 16 is selected by the switch 44. As is apparent from the drive-power-source switching boundary line map of FIG. 9, the motor-drive mode is selected when the vehicle is in a relatively low-load condition. In the motor-drive mode, therefore, a shifting action of the automatic transmission portion 20 in the step-variable shifting state of the power distributing mechanism 16 does not cause a considerable change of the engine speed, and the vehicle operator does not expect such a change of the engine speed as a result of the shifting action. In view of this, the switching control means 50 is arranged to place the power distributing mechanism 16 in the differential state or continuously-variable shifting state, in the motor-drive mode of the vehicle, for improving the fuel economy, even while the non-differential or step-variable shifting state is selected by the switch 44.

The switching control means 50 is further arranged to switch the power distributing mechanism 16 to the non-differential state (step-variable shifting state) even in the motor-drive mode of the vehicle, when the starting of the engine 8 is required, so that the speed $N_E$ of the engine 8 is raised to permit an early or smooth ignition of the engine 8. To start the engine 8 in the motor-drive mode in which the engine speed $N_E$ is held substantially zero as described above, the power distributing mechanism 16 is switched to the non-differential state by engagement of the switching brake B0 or switching clutch C0, so that the rotating speed of the first sun gear S1 is more rapidly raised to raise the speed $N_E$ of the engine 8, than when the power distributing mechanism 16 is placed in the differential state or continuously-variable state in which the rotating speed of the first sun gear S1 is raised by the first electric motor M1.

Figure 14:
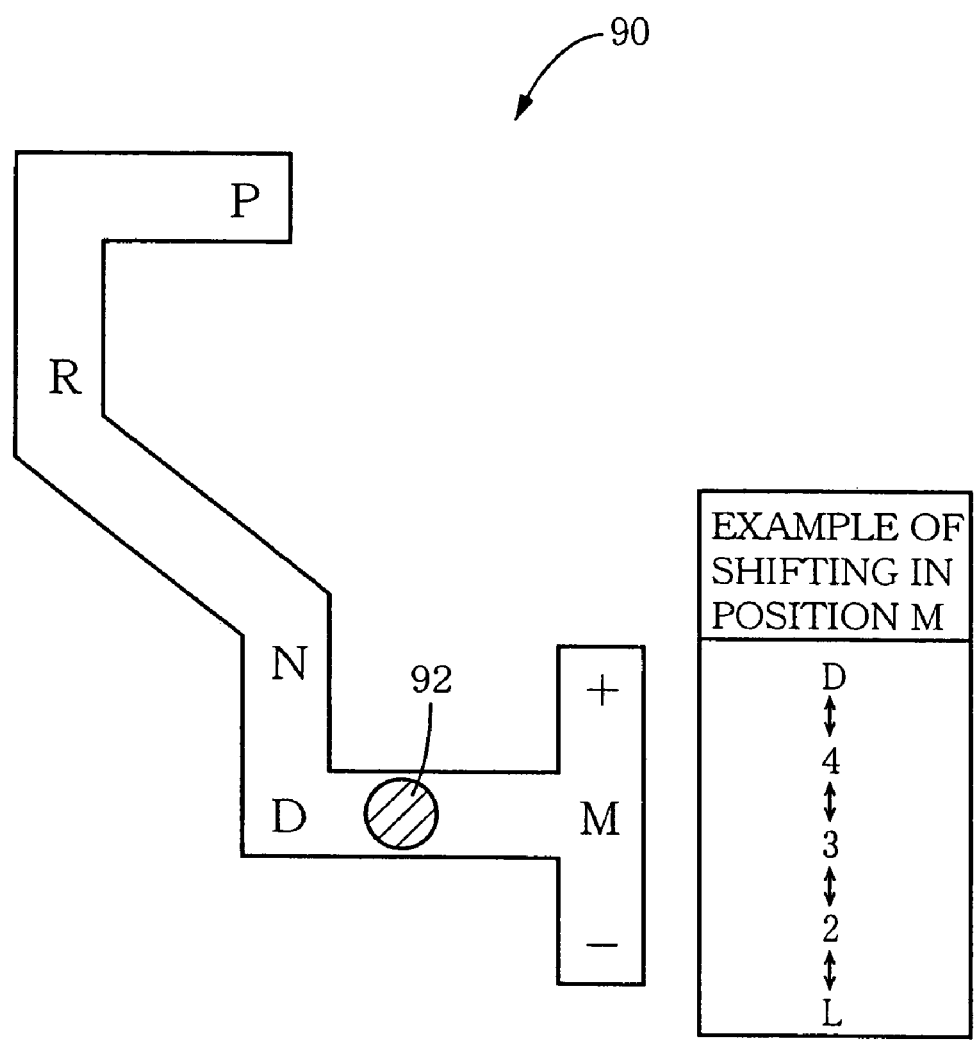
FIG. 14 is a view illustrating a manually operable shifting device including a shift lever, which is used to select one of a plurality of gear positions of the automatic transmission portion.

FIG. 14 shows an example of a manually operable shifting device in the form of a shifting device 90 including a shift lever 92, which is disposed laterally adjacent to an operator's seat, for example, and which is manually operated to select one of a plurality of gear positions consisting of a parking position P for placing the transmission mechanism 10 (namely, automatic transmission portion 20) in a neutral state in which a power transmitting path is disconnected with both of the switching clutch C0 and brake B0 placed in the released state, and at the same time the output shaft 22 of the automatic transmission portion 20 is in the locked state; a reverse-drive position R for driving the vehicle in the rearward direction; a neutral position N for placing the transmission mechanism 10 in the neutral state; an automatic forward-drive shifting position D; and a manual forward-drive shifting position M. The parking position P and the neutral position N are non-driving positions selected when the vehicle is not driven, while the reverse-drive position R, and the automatic and manual forward-drive shifting positions D, M are driving positions selected when the vehicle is driven. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 92 is operated to the manual forward-drive shifting position M, for manually selecting one of the positions "D" through "L". Described in detail, the shift lever 48 is movable from the manual forward-drive shifting position M to a shift-up position "+" and a shift-down position "−", which are spaced from each other in the longitudinal direction of the vehicle. Each time the shift lever 92 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions or gear positions of the automatic transmission portion 20 which are automatically selectable, so that the lowest overall speed ratio γT available is determined by the selected number of the selectable gear positions. The shift lever 48 is biased by biasing means such as a spring so that the shift lever 92 is automatically returned from the shift-up position "+" and shift-down position "−" back to the manual forward-drive shifting position M. The shifting device 90 is provided with shift-position sensors operable to detect the presently selected position of the shift lever 92, so that signals indicative of the presently selected operating position of the shift lever 48 and the number of shifting operations of the shift lever 92 in the manual forward-shifting position M.

When the shift lever 92 is operated to the automatic forward-drive shifting position D, the switching control means 50 effects an automatic switching control of the transmission mechanism 10 according to the stored switching boundary line map shown n FIG. 8, and the hybrid control means 52 effects the continuously-variable shifting control of the power distributing mechanism 16, while the step-variable shifting control means 54 effects an automatic shifting control of the automatic transmission portion 20. When the transmission mechanism 10 is placed in the step-variable shifting state, for example, the shifting action of the transmission mechanism 10 is automatically controlled to select an appropriate one of the first-gear position through the fifth-gear position indicated in FIG. 2. When the transmission mechanism 10 is placed in the continuously-variable shifting state, the speed ratio of the power distributing mechanism 16 is continuously changed, while the shifting action of the automatic transmission portion 20 is automatically controlled to select an appropriate one of the first-gear through fourth-gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 92 is operated to the manual forward-drive shifting position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the positions "D" through "L". When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission portion 20 is automatically controlled to select an appropriate one of the gear positions the number of which is determined by the manually selected one of the positions "D" through "L", so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

Figure 15:
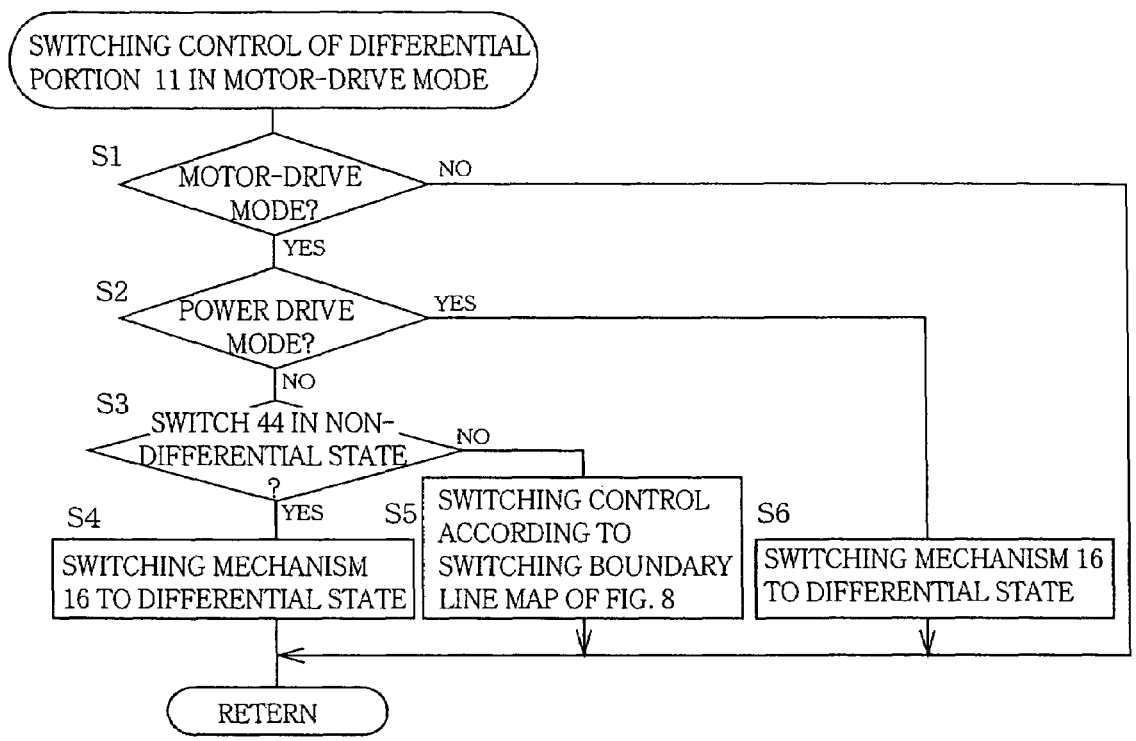
FIG. 15 is a flow chart illustrating a switching control of the differential portion by the electronic control device in the motor-drive mode.

FIG. 15 is a flow chart illustrating one of major control operations of the electronic control device 40, that is, a switching control routine to control the differential portion 11. This switching control routine is repeatedly executed with an extremely short cycle time of about several milliseconds to several tens of milliseconds, for example.

The switching control routine is initiated with step S1 corresponding to the motor-drive determining means 82, to determine whether the vehicle is in the motor-drive mode in which only the second electric motor M2, for example, is used as the drive power source. This determination is made according to the drive-power-source switching boundary line map shown in FIG. 9, by determining whether the vehicle condition represented by the vehicle speed V and the output torque $T_{OUT}$ is in the motor-drive region. When a negative decision (NO) is obtained in step S1, one cycle of execution of the present routine is terminated. When an affirmative decision (YES) is obtained in step S1, the control flow goes to step S2 corresponding to the engine-starting requirement determining means 82, to determine whether the starting of the engine 8 is required during running of the vehicle in the motor-drive mode. In the present embodiment, this determination is made by determining whether the power drive mode has been selected by the drive-mode selector switch 94 in the motor-drive mode. When an affirmative decision (YES) is obtained in step S2, the control flow goes to step S6 corresponding to the switching control means 50, to switch the power distributing mechanism 16 to the non-differential state or step-variable shifting state, for raising the speed $N_E$ of the engine 8.

When a negative decision (NO) is obtained in step S2, the control flow goes to step S3 corresponding to the manual selection determining means 84, to determine whether the switch 44 has been operated by the vehicle operator to select the step-variable shifting state or non-differential state of the power distributing mechanism 16. When an affirmative decision (YES) is obtained in step S3, the control flow goes to step S4 also corresponding to the switching control means 50, to switch the power distributing mechanism 16 to the differential state or continuously-variable shifting state, so that the engine speed $N_E$ is held substantially zero. When a negative decision (NO) is obtained in step S3, the control flow goes to step S5 also corresponding to the switching control means 50, to effect an automatic switching control of the power distributing mechanism 16 between the differential state and the non-differential state, according to the switching boundary line map of FIG. 8. Since the vehicle condition represented by the vehicle speed A and the output torque $T_{OUT}$ is in the low-load region or in the motor-drive region, the power distributing mechanism 16 is held in the differential state, so that the engine speed $N_E$ is held substantially zero.

In the present embodiment described above, the power distributing mechanism 16 provided with the switching clutch C0 and the switching brake B0 is switchable between the differential state in which the differential function of the differential portion 11 is available, and the non-differential state in which the differential function is not available. In the motor-drive mode in which the engine 8 is in the non-operated state and only the second electric motor M2, for example, is used as the drive power source, the switching control means 50 places the power distributing mechanism 16 in the differential state, so that the engine speed $N_E$ is held substantially zero, owing to the differential function of the differential portion 11, whereby a tendency of dragging of the engine 8 in its non-operated state is prevented or reduced, and the fuel economy is accordingly improved.

In the present embodiment wherein the seesaw type switch 44 is provided to manually select a desired one of the differential and non-differential states of the power distributing mechanism 16, the switching control means 50 places the power distributing mechanism 16 in the differential state during running of the vehicle in the motor-drive mode, even when the differential state is selected by the switch 44. Since the fuel economy is higher in the differential state of the power distributing mechanism 16, than in the non-differential state, the vehicle can be run with the improved fuel economy in the motor-drive mode, which is selected when the vehicle is in a low-load state.

The present embodiment is further arranged such that the switching control means 50 places the power distributing mechanism 16 in the non-differential state, even in the motor-drive mode, when the engine-starting requirement determining means 82 determines that the starting of the engine 8 is required. Accordingly, the speed $N_E$ of the engine 8 can be raised from zero, to facilitate the ignition of the engine 8, for thereby reducing the deterioration of the fuel economy upon starting of the engine 8, with a result of an improvement of the fuel economy.

The present embodiment is further arranged such that the engine-starting requirement determining means 82 determines that the starting of the engine 8 is required, when the power drive mode is selected by the drive-mode selector switch 94. In the power drive mode, therefore, the power distributing mechanism 16 is switched to the non-differential state, to permit an early or smooth ignition of the engine 8 and a rapid increase of the drive torque, so that the vehicle can be run with a relatively high degree of drivability in the power drive mode.

In the present embodiment, the power distributing mechanism 16 is provided with the switching clutch C0 and switching brake B0 to selectively place the power distributing mechanism 16 in one of the differential and non-differential states. In the motor-drive mode in which the engine 8 is in the non-operated state and only the second electric motor M2, for example, is used to drive the vehicle, the switching control means 50 switches the power distributing mechanism 16 to the non-differential state when the engine-starting requirement determining means 82 has determined that the starting of the engine 8 is required. Accordingly, the speed $N_E$ of the engine 8 can be raised from zero, to facilitate the ignition of the engine 8, for thereby reducing the deterioration of the fuel economy upon starting of the engine 8, with a result of an improvement of the fuel economy.

There will be described other embodiments of the present invention. In the following embodiments, the same reference signs as used in the first embodiment will be used to identify the functionally corresponding elements.

Second Embodiment

Figures 16, 17:
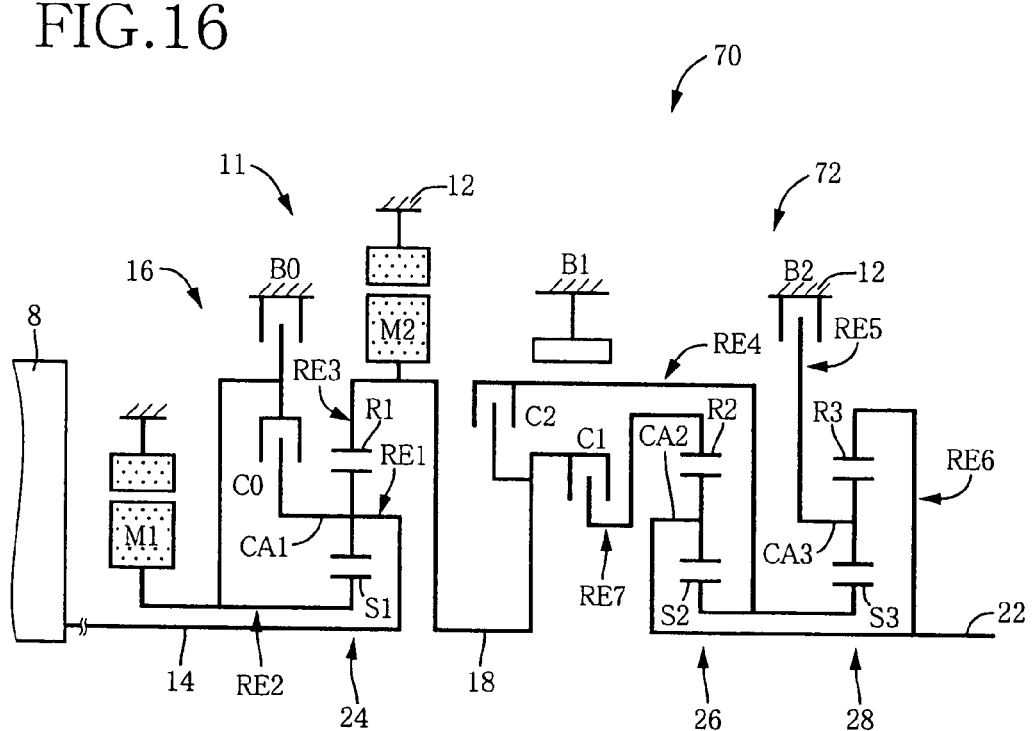
FIG. 16 is a schematic view corresponding to that of FIG. 1, showing an arrangement of a transmission mechanism of a hybrid vehicle according to another embodiment of this invention.
FIG. 17 is a table corresponding to that of FIG. 2, indicating shifting actions of the transmission mechanism of the hybrid vehicle of the embodiment of FIG. 16, in relation to different combinations of operating states of the hydraulically operated frictional coupling devices to effect the respective shifting actions.
Figure 18:
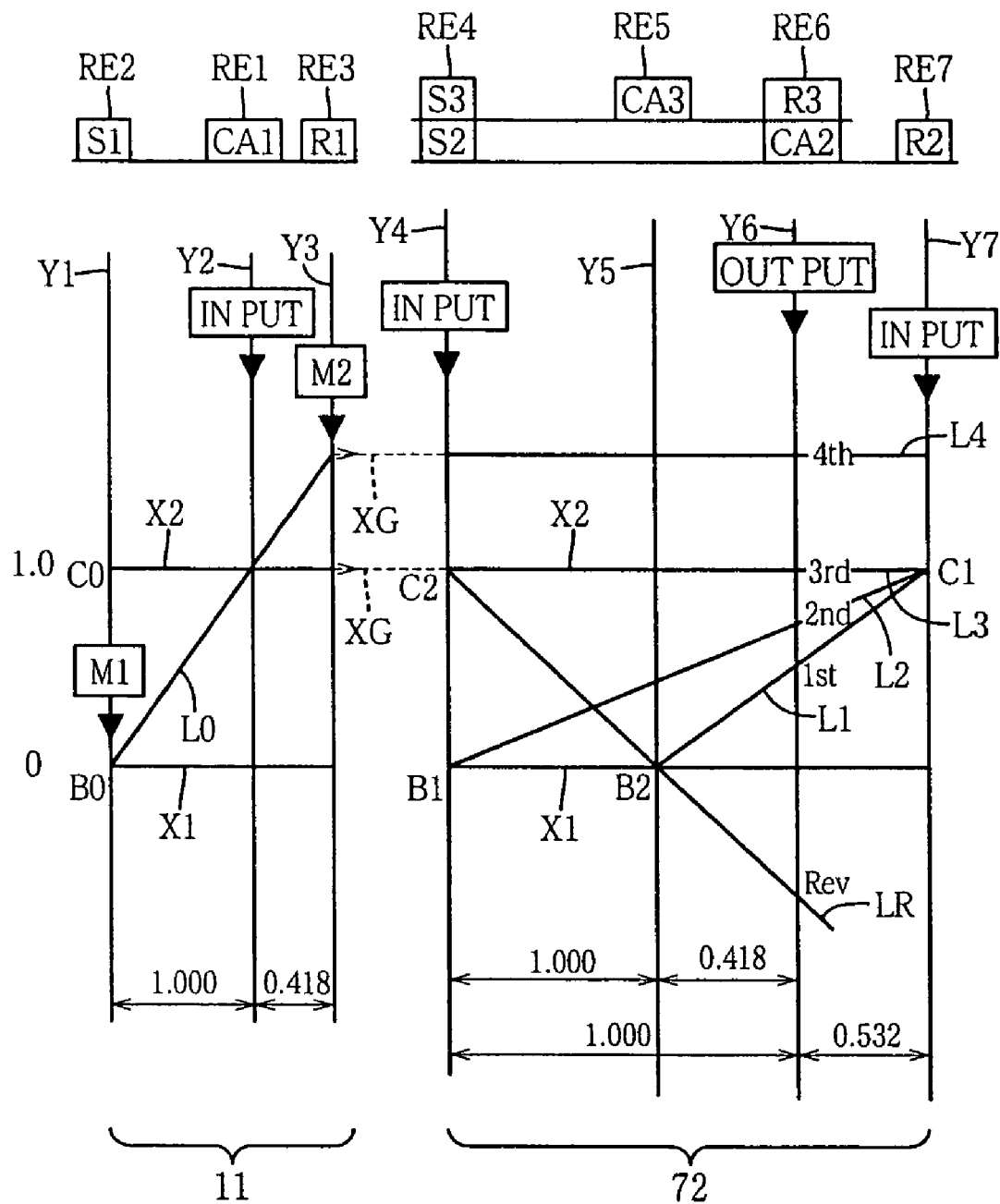
FIG. 18 is a collinear chart corresponding to that of FIG. 3, indicating relative rotating speeds of the rotary elements of the transmission mechanism of the hybrid vehicle of the embodiment of FIG. 16 operated in the step-variable shifting state, in different gear positions of the transmission mechanism.

Referring to the schematic view of FIG. 16, there is shown an arrangement of a transmission mechanism 70 according to the second embodiment of this invention. Although the transmission mechanism 70 is different from the transmission mechanism 10 according to the first embodiment of FIG. 1, the transmission mechanism 70 is controlled by an electronic control device which is substantially identical with the electronic control unit 40 described above with respect to the first embodiment. FIG. 17 is a table indicating gear positions of the transmission mechanism 70, and different combinations of engaged states of the hydraulically operated frictional coupling devices for respectively establishing those gear positions, while FIG. 18 is a collinear chart for explaining shifting operation of the transmission mechanism 70.

The transmission mechanism 70 includes the differential portion 11 having the first electric motor M1, power distributing mechanism 16 and second electric motor M2, as in the first embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22, through the power transmitting member 18. The power distributing mechanism 16 includes the first planetary gear set 24 of single-pinion type having a gear ratio $\rho1$ of about 0.418, for example, and the switching clutch C0 and the switching brake B0, as in the preceding embodiment. The automatic transmission portion 72 includes a single-pinion type second planetary gear set 26 having a gear ratio $\rho2$ of about 0.532, for example, and a single-pinion type third planetary gear set 28 having a gear ratio $\rho3$ of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first-gear position (first-speed position) through a fourth-gear position (fourth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 17. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as a continuously variable transmission described above. In the present transmission mechanism 70, therefore, a step-variable transmission is constituted by the automatic transmission portion 20, and the power distributing mechanism 16 which is placed in the fixed-speed-ratio shifting state by engagement of the switching clutch C0 or switching brake B0. Further, a continuously variable transmission is constituted by the automatic transmission portion 20, and the power distributing mechanism 16 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by engaging both of the switching clutch C0 and switching brake B0.

Where the transmission mechanism 70 functions as the step-variable transmission, for example, the first-gear position having the highest speed ratio γ1 of about 2.804, for example, is established by engaging actions of the switching clutch C0, first clutch C1 and second brake B2, and the second-gear position having the speed ratio γ2 of about 1.531, for example, which is lower than the speed ratio γ1, is established by engaging actions of the switching clutch C0, first clutch C1 and first brake B1, as indicated in FIG. 17. Further, the third-gear position having the speed ratio γ3 of about 1.000, for example, which is lower than the speed ratio γ2, is established by engaging actions of the switching clutch C0, first clutch C1 and second clutch C2, and the fourth-gear position having the speed ratio γ4 of about 0.705, for example, which is lower than the speed ratio γ3, is established by engaging actions of the first clutch C1, second clutch C2, and switching brake B0. Further, the reverse-gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C1 and the switching brake B0 are both released, as indicated in FIG. 17, so that the power distributing mechanism 16 functions as the differential portion 11, while the automatic transmission portion 72 connected in series to the power distributing mechanism 16 functions as the step-variable transmission, whereby the speed of the rotary motion transmitted to the automatic transmission portion 72 placed in one of the first-gear, second-gear and third-gear positions, namely, the rotating speed of the power transmitting member 18 is continuously changed, so that the speed ratio of the transmission mechanism when the automatic transmission portion 72 is placed in one of those gear positions is continuously variable over a predetermined range. Accordingly, the speed ratio of the automatic transmission portion 72 is continuously variable across the adjacent gear positions, whereby the overall speed ratio γT of the transmission mechanism 70 is continuously variable.

The collinear chart of FIG. 18 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart of FIG. 18 indicates the rotating speeds of the individual elements of the power distributing mechanism 16 when the switching clutch C1 and brake B0 are released, and the rotating speeds of those elements when the switching clutch C0 or brake B0 is engaged, as in the preceding embodiments In FIG. 18, four vertical lines Y4, Y5, Y6 and Y7 corresponding to the automatic transmission portion 72 respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first-speed position. The rotating speed of the output shaft 22 in the first-speed position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 and the horizontal line X2, and a point of intersection between the vertical line Y5 indicative of the rotating speed of the fifth rotary element RE5 and the horizontal line X1. Similarly, the rotating speed of the output shaft 22 in the second-speed position established by the engaging actions of the first clutch C1 and first brake B1 is represented by a point of intersection between an inclined straight line L2 determined by those engaging actions and the vertical line Y6 indicative of the rotating speed of the sixth rotary element RE6 fixed to the output shaft 22. The rotating speed of the output shaft 22 in the third-speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first-speed through third-speed positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth-speed position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22. The rotating speed of the output shaft 22 in the reverse drive position R established by the engaging actions of the second clutch C2 and second brake B2 is represented by a point of intersection between an inclined straight line LR determined by those engaging actions and the vertical line Y6 indicative of the rotating speed of the sixth rotary element RE6 fixed to the output shaft 22.

The transmission mechanism 70 of the present second embodiment is also constituted by the differential portion 11 functioning as the continuously-variable shifting portion or first shifting portion, and the automatic transmission portion 72 functioning as the step-variable shifting portion or second shifting portion, so that the present transmission mechanism 70 has advantages similar to those of the first embodiment.

The first and second embodiments described above may be modified as needed. In the preceding embodiments, the step S2 of the switching control routine illustrated in FIG. 15 is formulated to determine whether the starting of the engine 8 is required, on the basis of the output of the drive-mode selector switch 94, that is, by determining whether the power drive mode is selected by the drive-mode selector switch 94. However, the determination in the step S2 as to whether the starting of the engine 8 is required need not rely on the output of the drive-mode selector switch 94. For example, the step S2 may be formulated to determine whether the amount or rate of increase of the operating amount of the accelerator pedal is higher than a predetermined threshold, that is, whether an amount of increase of the operator's required vehicle drive force is larger than a predetermined threshold, or whether the first electric motor M1 is required to be operated as an electric generator to charge the electric-energy storage device 60 due to reduction of the electric energy amount SOC stored therein below a lower limit.

The engine-starting requirement determining means 82 may be arranged to determine that the starting of the engine 8 is required, when the vehicle drive mode is changed from the motor-drive mode to the engine-drive mode, according to the drive-power-source switching boundary line map of FIG. 9, after the motor-drive determining means 80 has once determined that the vehicle is in the motor-drive mode, according to the switching boundary line map of FIG. 9. In this case, the motor-drive determining means 80 is considered to also function as the engine-starting requirement determining means 82.

In the first and second embodiments, the motor-drive determining means 80 or step S1 of the switching control routine of FIG. 1 is arranged or formulated to make the determination as to whether the vehicle is in the motor-drive mode, by determining whether the vehicle condition is in the motor-drive region defined by the power-drive-source switching boundary map of FIG. 9. However, the motor-drive determining means 80 may be arranged to make the determination in step Si on the basis of a signal received from the hybrid control means 52 assigned to implement the motor-drive control.

In the first and second embodiments, the switching-map changing means 86 of the switching control means 50 is arranged to change the switching boundary line map of FIG. 8 so as to change the entirety of the continuously-variable or step-variable shifting region corresponding to the shifting state not selected by the switch 44, to the other shifting region corresponding to the shifting state selected by the switch 44. However, the switching-map changing means 86 may be arranged to change a portion of the shifting region corresponding to the non-selected shifting state to the other shifting region corresponding to the selected shifting state. For example, the switching boundary lines (indicated by the broken and one-dot chain lines) are moved to increase the upper vehicle-speed limit 1 or upper output-torque limit T1, so as to enlarge the continuously-variable or step-variable shifting region corresponding to the shifting state selected by the switch 44.

Third Embodiment

Figure 19:
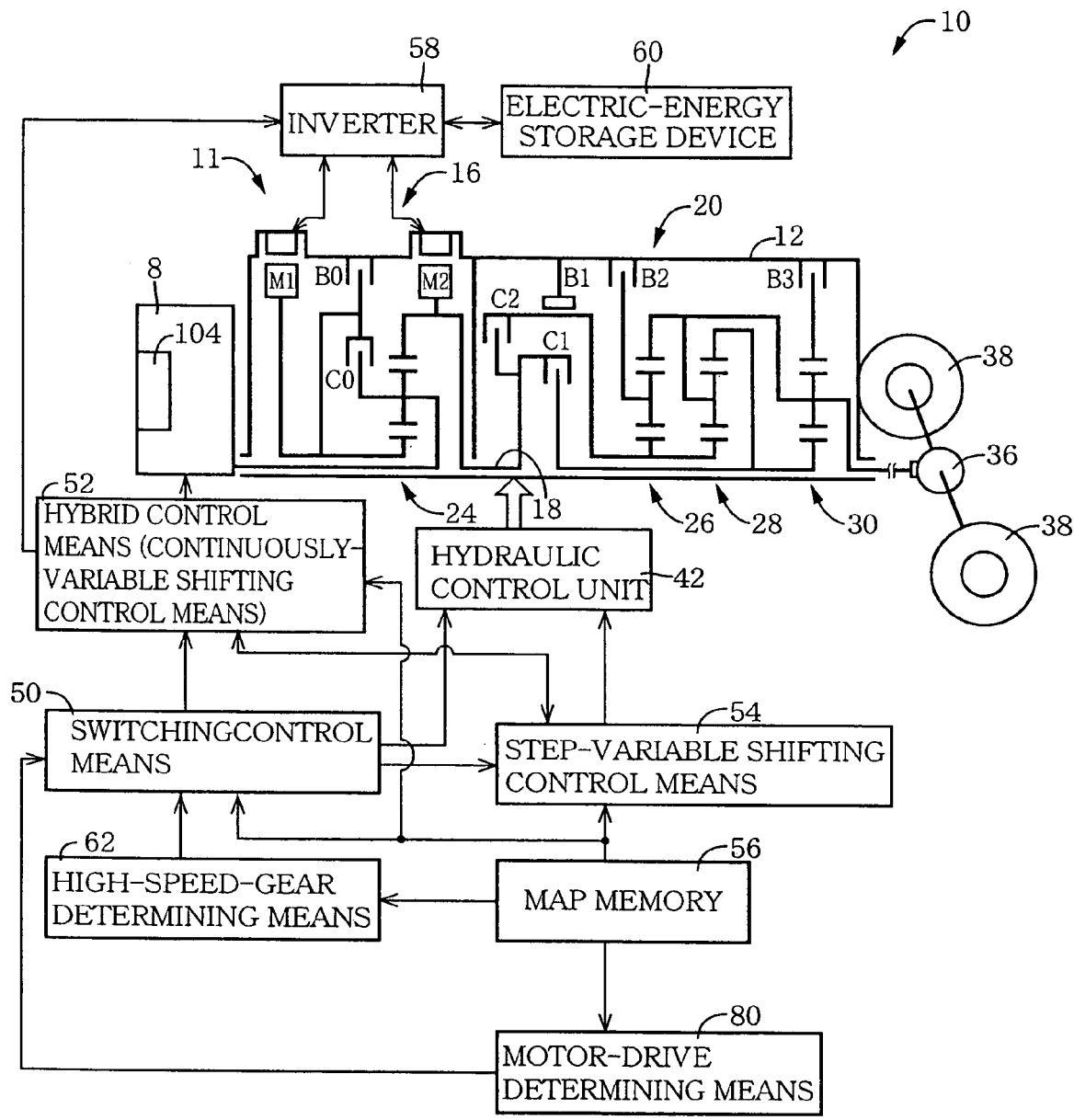
FIG. 19 is a functional block diagram corresponding to that of FIG. 7, illustrating major control functions performed by the electronic control device in a further embodiment of this invention.

Referring to the block diagram of FIG. 19, there are illustrated major control functions performed by the electronic control device 40 arranged to control the transmission mechanism 10 of FIG. 1 according to a third embodiment of this invention. The electronic control device 40 according to the third embodiment is different from that of the first embodiment, in that the electronic control device 40 according to the third embodiment does not include the engine-starting requirement determining means 82 and the manual selection determining means 94, and in that the switching control means 50 in the third embodiment does not include the switching-map changing means 86.

In the present third embodiment, the step-variable shifting control means 54 controls the automatic shifting operation of the automatic transmission portion 20 on the basis of the vehicle speed V and the output torque $T_{OUT}$ of the automatic transmission portion 20 and according to the shifting boundary line map indicated by the solid and one-dot chain lines in FIG. 8, as in the first embodiment. The switching control means 50 controls the hydraulic control unit 42 to place the transmission mechanism 10 selectively in one of the continuously-variable shifting state and the step-variable shifting state, on the basis of the vehicle speed V and the output torque $T_{OUT}$ and according to the shifting-state switching boundary line map indicated by the broken and two-dot chain lines in FIG. 8, as in the first embodiment. The shifting boundary line map and the switching boundary line map are stored in the map memory 56.

Figure 20:
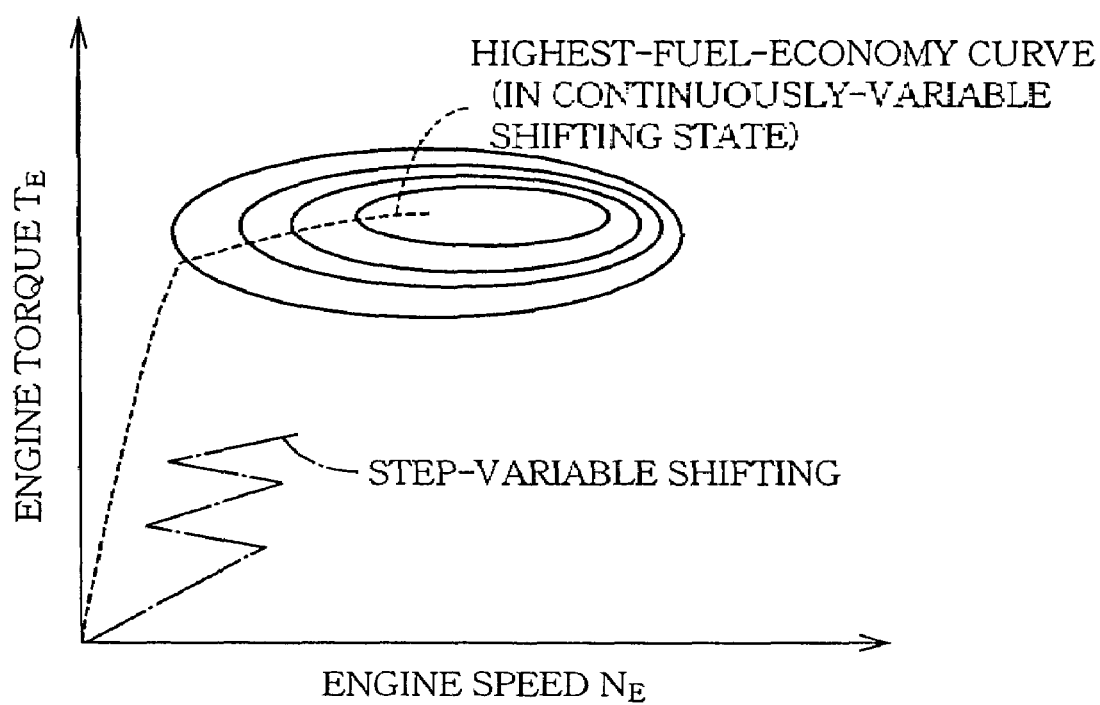
FIG. 20 is a view indicating an example of a fuel-economy map including a highest-fuel-economy curve of an engine operating in the continuously-variable shifting state indicated by broken line, and a highest-fuel-economy curve of the engine operating in the step-variable shifting state indicated by one-dot chain line.

The map memory 56 also stores the highest-fuel-map curve indicated by broke line in FIG. 20. The highest-fuel-economy curve is formulated to satisfy both of the desired operating efficiency and the highest fuel economy of the engine 8. The hybrid control means 52 determines the target value of the overall speed ratio γT of the transmission mechanism 10 so that the engine 8 is operated according to the highest-fuel-economy curve. The hybrid control means 52 controls the speed ratio γ0 of the differential portion 11, so as to obtain the target value of the overall speed ratio γT, so that the overall speed ratio γT can be controlled within the predetermined range between 13 and 0.5, for example.

Figure 21:
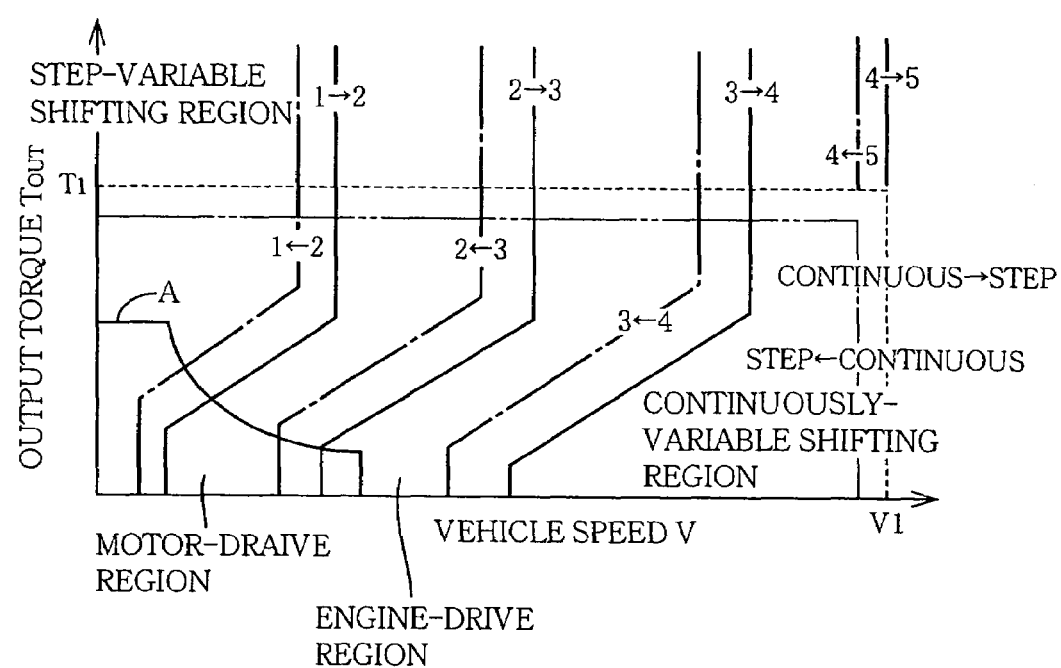
FIG. 21 is a view indicating a relationship among a stored shifting boundary line map, a stored shifting-state switching boundary line map and a stored drive-power-source switching boundary line map.

As in the first embodiment, the map memory 56 also stores the drive-power-source switching boundary line map shown in FIG. 9 for illustrative purpose, and the hybrid control means 52 selectively establishes the engine-drive mode and the motor-drive mode, on the basis of the vehicle speed V and the output torque TOUT and according to the drive-power-source switching boundary line map. FIG. 21 indicates the relationship of the drive-power-source switching boundary line map of FIG. 9 with respect to the shifting boundary line map of FIG. 8 and the shifting-state switching boundary line map of FIG. 8.

In the third embodiment, the hybrid control means 52 is arranged to hold the engine 8 in an operated state, owing to the electric CVT function of the differential portion 11, even while the vehicle is stationary or running at a low speed. When the operation of the first electric motor M1 as the electric generator becomes necessary due to an excessive drop of the electric energy amount SOC stored in the electric-energy storage device 60 while the vehicle is stationary, for example, the first electric motor M1 is operated by a drive force of the engine 8, at a speed high enough to hold the engine speed $N_E$ at a level at which the engine 8 can be held in the operated state owing to the differential function of the power distributing mechanism 16, even if the speed $N_{M2}$ of the second electric motor M2 governed or influenced by the vehicle speed V is zeroed (substantially zeroed) upon stopping of the vehicle.

The hybrid control means 52 is further arranged to hold the engine speed $N_E$ at a suitable level by controlling the speeds of the first and second electric motors M1, M2 through the electric CVT function of the differential portion 11, irrespective of whether while the vehicle is stationary or running. For example, the hybrid control means 52 can raise the engine speed $N_E$ by raising the speed $N_{M1}$ of the first electric motor M1 while maintaining the speed $N_{M2}$ of the second electric motor M2 (governed or influenced by the vehicle speed V) constant, as is understood from the collinear chart of FIG. 3.

When the automatic operation of the automatic transmission portion 20 is controlled by the step-variable shifting control means 54, the speed ratio γ of the automatic transmission portion 20 is changed in steps, so that the overall speed ratio γT of the transmission mechanism 10 is changed in steps in the process of a shifting action of the automatic transmission portion 20. To restrict the change of the overall speed ratio γT of the transmission mechanism 10, the hybrid control means 52 controls the shifting action of the differential portion 11 so that the speed ratio of the differential portion 11 changes in a direction opposite to the direction of change of the speed ratio γ of the automatic transmission portion 20, in synchronization of the shifting action of the automatic transmission portion 20. In other words, the hybrid control means 52 controls the shifting action of the differential portion 11 in synchronization of the shifting action of the automatic transmission portion 20 so that the γT of the transmission mechanism 10 continuously changes in the process of the shifting action of the automatic transmission portion 20. For example, the hybrid control means 52 controls the shifting action of the differential portion 11 such that the speed ratio γ0 of the differential portion 11 changes in the direction opposite to the direction of step change of the speed ratio γ of the automatic transmission portion 20, by an amount corresponding to this step change, in synchronization of the shifting action of the automatic transmission portion 20, so that the overall speed ratio γT of the transmission mechanism 10 does not have a transient change before and after the shifting action of the automatic transmission 20.

From another point of view, an engine is generally operated as indicated by a one-dot chain line in FIG. 20, where the engine 8 is operatively connected to a step-variable transmission, and operated along the highest-fuel-economy curve indicated by the broken line in FIG. 20, where the engine is operatively connected to a continuously variable transmission, or along a fuel-economy curve closer to the highest-fuel-economy curve than where the engine is operatively connected to the step-variable transmission. Therefore, the operating point of the engine represented by the engine speed $N_E$ and torque $T_E$ to obtain the desired engine output is closer to the highest-fuel-economy curve and accordingly permits a higher degree of fuel economy of the engine, where the engine is operatively connected to the continuously variable transmission than where the engine is operatively connected to the step-variable transmission. In view of this, the hybrid control means 52 controls the speed ratio γ0 of the differential portion 11 so that the engine 8 is operated along the highest-fuel-economy curve of FIG. 20, to prevent deterioration of the fuel economy which would take place due to the step change of the speed ratio of the automatic transmission portion 20 upon a shifting action of the automatic transmission portion 20.

When the vehicle is in the motor-drive mode, for example, the hybrid control means 52 controls the first and second electric motors M1, M2 so that the speed $N_{M2}$ of the second electric motor M2 changes according to a change of the input speed of the automatic transmission portion 20, that is, according to a change of the rotating speed of the power transmitting member 18 as a result of a shifting action of the automatic transmission portion 20 under the control of the step-variable shifting control means 54, and so that the first electric motor M1 is freely rotated at a controlled speed so as to zero or substantially zero the engine speed $N_E$.

The high-speed-gear determining means 62 and the motor-drive determining means 80 have the same functions as described above with respect to the first embodiment of FIG. 7. Although the switching control means 50 places the transmission mechanism 10 (differential portion 11) selectively in one of the step-variable and continuously-variable shifting state, according to the switching boundary line map of FIG. 8, the switching control means 50 may place the transmission mechanism 10 in the step-variable shifting state even when the vehicle condition is in the continuously-variable shifting region, upon detection of any functional deterioration or defect of the components such as the first and second electric motors M1, M2, inverter 58 and electric-energy storage device 50 which are associated with the electric path described above and which are operable to place the differential portion 11 as the electrically controlled continuously variable transmission.

As described above, the differential portion 11 is switchable between the continuously-variable and step-variable (fixed-speed-ratio) shifting states. In the continuously-variable shifting state of the differential portion 11, the engine speed $N_E$ can be controlled irrespective of the vehicle running speed V, owing to the function of the differential portion 11 operated as the electrically controlled continuously variable transmission. When the engine 8 is in its non-operated state, the electric motor M1 is freely rotated under the control of the hybrid control means 52, so that the engine speed is held zero or substantially zero, irrespective of the vehicle speed V. In the fixed-speed-ratio shifting state of the differential portion 11, the engine 8 is mechanically connected to the drive wheels 38, so that the engine speed $N_E$ is governed by the vehicle speed V, namely, the engine 8 placed in its non-operated state is driven at a speed influenced or governed by the vehicle speed V.

In the fixed-speed-ratio shifting state of the differential portion 11 while the vehicle is in the motor-drive mode, the engine speed $N_E$ is not held zero or substantially zero, so that the engine 8 placed in its non-operated state would suffer from a tendency of dragging due to a so-called "pumping loss", which increases the load acting on the second electric motor M2 operating as the vehicle drive power source, leading to a risk of deterioration of the fuel economy of the vehicle.

To prevent or reduce the dragging of the engine 8 in the motor-drive mode, that is, when the motor-drive determining means 80 has determined that the vehicle condition is in the motor-drive region, the switching control means 50 controls the hydraulic control unit 42 to release both of the switching clutch C0 and switching brake B0, for thereby placing the differential portion 11 in the continuously-variable shifting state, namely, for placing the power distributing mechanism 16 in the differential state, so that the engine speed $N_E$ is held zero or substantially zero under the control of the hybrid control means 52, irrespective of the vehicle speed V.

When the motor-drive determining means 80 has determined that the vehicle condition is in the motor-drive region, the step-variable shifting control means 54 selects the shifting boundary lines for controlling the automatic shifting operation of the automatic transmission portion 20, in the motor-drive mode, that is, selects a portion of the shifting boundary line map of FIG. 8, which portion is located within the motor-drive region defined by the drive-power-source switching boundary line map of FIG. 9 as superimposed on the shifting boundary line map of FIG. 8, as indicated in FIG. 21.

When the motor-drive determining means 80 has determined that the vehicle condition is not in the motor-drive region, that is, the vehicle condition is in the engine-drive region, the switching control means 50 selects the switching boundary lines selected for the engine-drive mode to select the continuously-variable or step-variable shifting state of the differential portion 11, and the step-variable shifting control means 54 selects the shifting boundary lines for controlling the automatic shifting operation of the automatic transmission portion 20 in the engine-drive mode, that is, selects a portion of the shifting boundary line map of FIG. 8, which portion is located within the engine-drive region of the boundary line map of FIG. 9 as superimposed on the shifting boundary line map of FIG. 8, as indicated in FIG. 21. It is noted that the boundary lines defining the continuously-variable and step-variable shifting regions all are located within the engine-drive region, as indicated in FIG. 21, and are used as the shifting-state switching map in the engine-drive mode.

Figure 22:
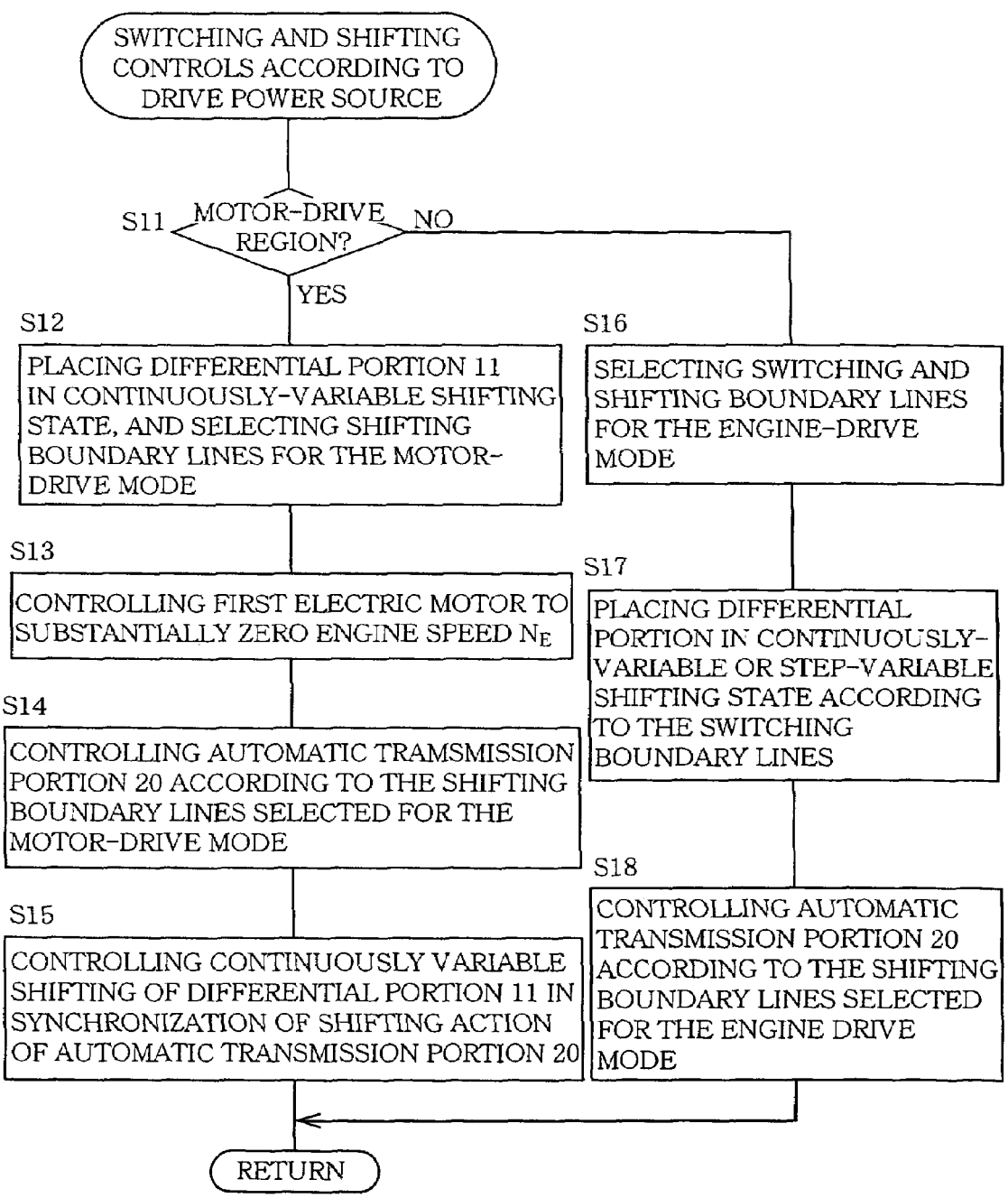
FIG. 22 is a flow chart illustrating a switching control of the differential portion and a shifting control of the automatic transmission portion by the electronic control device, according to the selected drive power source, in the embodiment of FIG. 19.

Referring next to the flow chart of FIG. 22, there is illustrated a switching and shifting control routine performed by the electronic control device 40 in the third embodiment of FIG. 19, to place the differential portion 11 selectively in one of the continuously-variable and step-variable shifting state, and to control the shifting operation of the transmission mechanism 10, depending upon whether the vehicle is in the motor-drive mode or engine-drive mode. This control routine is repeatedly executed with an extremely short cycle time of about several milliseconds to several tens of milliseconds, for example.

The control routine of FIG. 21 is initiated with step S11 corresponding to the motor-drive determining means 80, to determine whether the vehicle condition represented by the vehicle speed V and output torque $T_{OUT}$ is in the motor-drive region defined by the drive-power source switching boundary line map of FIG. 9.

When an affirmative decision (YES) is obtained in step S11, the control flow goes to step S12 corresponding to the switching control means 50 and the step-variable shifting control means 54, to command the hydraulic control unit 42 to release both of the switching clutch C0 and the switching brake B0, for thereby placing the differential portion 11 in the continuously-variable shifting state, that is, placing the power distributing mechanism 16 in the differential state. In this step S12, the step-variable shifting control means 54 selects the shifting boundary lines for the motor-drive mode, that is, a portion of the shifting boundary line map which is located within the motor-drive region defined by the drive-power-source switching boundary line map, as indicated in FIG. 21.

Step S12 is followed by step S13 corresponding to the hybrid control means 52, in which the first electric motor M1 is controlled to be freely rotated in the negative direction, for zeroing or substantially zeroing the engine speed $N_E$, owing to the differential function of the differential portion 11, for thereby preventing or reducing a tendency of dragging of the engine 8 in its non-operated state, to improve the fuel economy. In other words, the speed ratio γ0 of the differential portion 11 is controlled to zero or substantially zero the engine speed $N_E$.

Step S13 is followed by step S14 corresponding to the step-variable shifting control means 54, in which the shifting operation of the automatic transmission portion 20 is controlled according to the shifting boundary lines selected in step S12 for use in the motor-drive mode. Namely, the step-variable control means 54 determines the gear position to which the automatic transmission portion 20 should be shifted, on the basis of the vehicle condition represented by the vehicle speed V and the output torque $T_{OUT}$, and according to the selected motor-drive shifting boundary lines. The step-variable control portion 54 commands the hydraulic control unit 42 to control the hydraulically operated frictional coupling devices so that the automatic transmission portion 20 is shifted to the determined gear position.

Step S14 is followed by step S15 corresponding to the hybrid control means 52, in which the continuously variable shifting of the differential portion 11 is controlled in synchronization with the shifting action of the automatic transmission portion 20, so that the overall speed ratio γT of the transmission mechanism 10 is continuously changed in the process of the shifting action of the automatic transmission portion 20. For example, the hybrid control means 52 controls the first and second electric motors M1, M2 so that the speed $N_{M2}$ of the second electric motor M2 changes according to a change of the input speed of the automatic transmission portion 20 as a result of the shifting action of the automatic transmission portion 20 in step S14, and so that the first electric motor M1 can be freely rotated at a controlled speed so as to zero or substantially zero the engine speed $N_E$.

When a negative decision (NO) is obtained in step S11, the control flow goes to step S16 corresponding to the switching control means 50 and the step-variable shifting control means 54, to select the shifting boundary lines for the engine-drive mode, that is, a portion of the shifting boundary line map which is located within the engine-drive region, as indicated in FIG. 21, and the shifting-state switching boundary lines for the engine-drive mode, which are all located within the engine-drive region.

Step S16 is followed by step S17 corresponding to the switching control means 50 and the high-speed-gear determining means 62, in which the differential portion 11 (transmission mechanism 10) is selectively placed in the continuously-variable shifting state or the step-variable shifting state, on the basis of the vehicle condition represented by the vehicle speed V and output torque $T_{OUT}$, and according to the shifting-state switching boundary lines selected in step S16 for use in the engine-drive mode. When the switching control means 50 has determined that the vehicle condition is in the step-variable shifting region defined by the shifting boundary lines and when the high-speed-gear determining means 62 has determined that the automatic transmission portion 20 should be shifted to the fifth-gear position, the hydraulic control unit 42 is commanded to release the switching clutch C0 and engage the switching brake B0, to place the differential portion 11 in the non-differential state (step-variable shifting state or locked state). When the high-speed-gear determining means 62 has not determined that the automatic transmission portion 20 should be shifted to the fifth-gear position, the hydraulic control unit 42 is commanded to engage the switching clutch C0 and release the switching brake B0, to place the differential portion 11 in the non-differential state. When the switching control means 50 has determined that the vehicle condition is in the continuously-variable shifting region, the hydraulic control unit 42 is commanded to release both of the switching clutch C0 and switching brake B0, to place the differential portion 11 in the differential state (continuously-variable shifting state).

Step S17 is followed by step S18 corresponding to the step-variable shifting control means 54, in which the shifting operation of the automatic transmission portion 20 is controlled according to the shifting boundary lines selected in step S16 for use in the engine-drive mode. Namely, the step-variable control means 54 determines the gear position to which the automatic transmission portion 20 should be shifted, on the basis of the vehicle condition represented by the vehicle speed V and the output torque $T_{OUT}$, and according to the selected motor-drive shifting boundary lines. The step-variable control portion 54 commands the hydraulic control unit 42 to control the hydraulically operated frictional coupling devices so that the automatic transmission portion 20 is shifted to the determined gear position.

In the present third embodiment described above, the power distributing mechanism 16 is controlled by the switching control means 50, so as to be placed in the differential state while the vehicle is in the motor-drive mode. In this differential state of the power distributing mechanism 16, the speed $N_{M1}$ of the first electric motor M1 and the speed $N_E$ of the engine 8 are not influenced or governed by the vehicle speed V, that is, by the rotating speed of the power transmitting member 18, namely, the first electric motor can be freely rotated in the reverse direction at a controlled speed so as to zero or substantially zero the engine speed $N_E$, under the control of the hybrid control means 52. Unlike the non-differential state of the power distributing mechanism 16, the differential state makes it possible to minimize the pumping loss and the tendency of dragging of the engine 8, leading to an improvement in the fuel economy of the vehicle.

Fourth Embodiment

Figure 23:
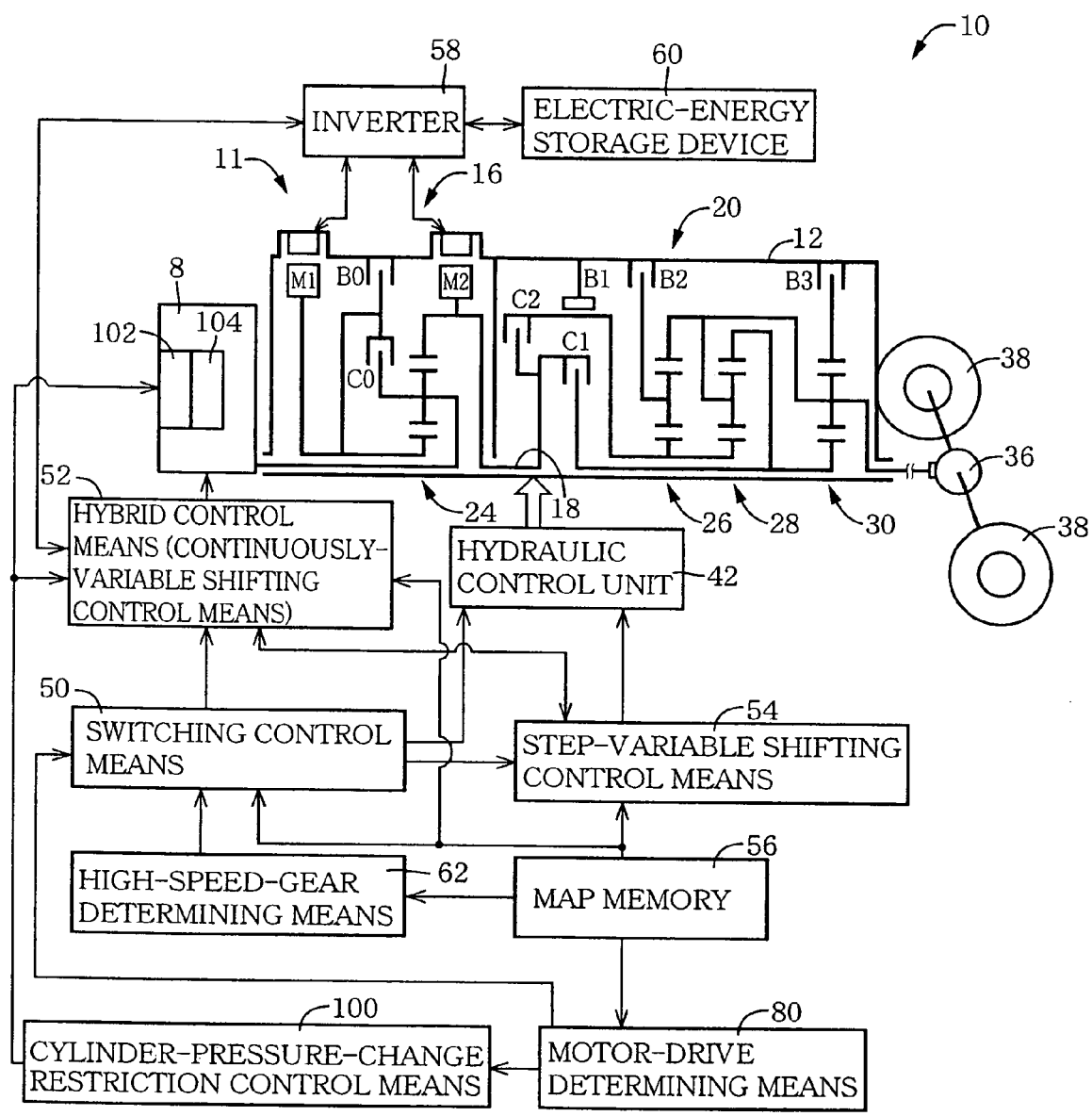
FIG. 23 a functional block diagram corresponding to that of FIG. 7, illustrating major control functions performed by the electronic control device in a still further embodiment of this invention.

Referring next to the functional block diagram of FIG. 23, there are illustrated major control functions performed by the electronic control device 40 arranged to control the transmission mechanism 10 of FIG. 1 according to a fourth embodiment of this invention. The electronic control device 40 according to the fourth embodiment is different from that of the third embodiment of FIG. 19, in that the electronic control device 40 according to the fourth embodiment further includes cylinder-pressure-change restricting control means 100 for performing a cylinder-pressure-change restricting control of the engine 8 in which a change of the pressure in selected at least one of the cylinders is restricted. Namely, the engine 8 has a plurality of cylinders at least one of which is selectable as at least one pressure-change restricted cylinder the number of which is variable. The engine 8 is operable in a cylinder-pressure-change restricted state under the control of the cylinder-pressure-change restricting control means 100, in which a change of a pressure in each of the at least one pressure-change restricted cylinder is restricted. Accordingly, the electronic control device 40 in the present fourth embodiment is different from that in the third embodiment in the manner of control of the engine speed $N_E$ by the hybrid control means 52 in the cylinder-pressure-change restricting control.

For the cylinder-pressure-change restricting means 100 to perform the cylinder-pressure-change restricting control, the engine 8 is provided with a valve-timing changing mechanism 102 operable to change the operating timings of its intake and exhaust valves, and the fuel injection valve 104 (described above by reference to FIG. 6, with respect to the first embodiment) operable to inject a fuel into the intake pipe or into the cylinders. In the cylinder-pressure-change restricting control, at least one of the cylinders selected as the at least one pressure-change restricted cylinder is placed in the decompression state by the valve-timing changing mechanism 90. Further, a fuel supply by the fuel injection valve 104 to the at least one pressure-change restricted cylinder is cut to reduce the amount of fuel consumption. The number of the at least one pressure-change restricted cylinder (placed in the decompression and fuel-cut state) is variable, and changed depending upon the load acting on the engine 8.

In the present embodiment, the engine 8 is operable in a pressure-change restricted state in which the pressure in each of the at least one pressure-change restricted cylinder is restricted. The engine 8 is placed in this pressure-change restricted state by placing each pressure-change restricted cylinder in the decompression state, to reduce the pumping loss of the engine 8 to an extent which depends upon the number of the selected at least one pressure-change-restricted cylinder. When all of the cylinders are selected as the pressure-change restricted cylinders, the engine 8 is placed in the inoperable state. When at least one but not all of the cylinders is selected as the at least one pressure-change restricted cylinder, the engine 8 is placed in a partially operable state. The pressure-change restricting control of the engine 8 to place the at least one pressure-change restricted cylinder in the decompression state and cut the fuel supply to the at least one pressure-change restricted cylinder is different from a so-called "fuel-cut control" of the engine 8 in which all of the cylinders are supplied with a fuel but are held in the compressible state. In the fuel-cut control, the pumping loss and dragging of the engine 8 will take place when the engine 8 is in the operated state. The dragging is defined as generation of a resistance to the reciprocating movements of the pistons.

The compressible state of each cylinder is a normal state of a four-cycle engine in which the air admitted into the cylinder in the intake stroke is compressible in the compression stroke. The decompression state of each pressure-change-restricted cylinder can be established by opening the intake or exhaust valve or changing the operating timing of the intake or exhaust valve, to inhibit the normal compression of the intake air, for thereby restricting a change (an increase) of the pressure in the cylinder so that the resistance to the rotary motion of the crankshaft is reduced. In this decompression state, the throttle valve or an EGR valve may be opened to further reduce the rotation resistance of the crankshaft.

The cylinder-pressure-change restricting means 100 is arranged to perform the pressure-change restricting control of the engine 8, that is, to operate the engine 8 in the cylinder-pressure restricted state, when the motor-drive determining means 80 has determined that the vehicle condition is in the motor-drive region. Namely, the cylinder-pressure-change restricting means 100 commands the valve-timing changing mechanism 102 to place at least one of the cylinders in the decompression state, so that the at least one cylinder in the decompression state functions as at least one pressure-change restricted cylinder. The cylinder-pressure-change restricting control permits reduction of the pumping loss of the engine 8 and improvement of the fuel economy, in the motor-drive mode, without the hybrid control means 52 controlling the speed $N_{M1}$ of the first electric motor M1 so as to zero or substantially zero the speed $N_E$ of the engine 8.

Figure 24:
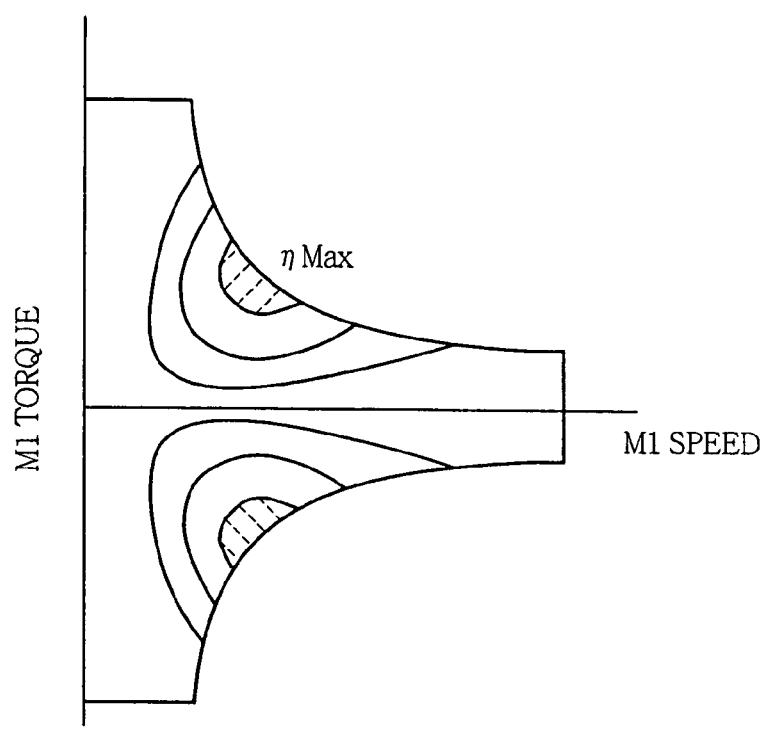
FIG. 24 is a view indicating an example of efficiency curves of a first electric motor.

When the engine 8 is operated in the pressure-change restricted state in the motor-drive mode, therefore, the hybrid control means 52 controls an operation of the first electric motor M1 so as to improve the operating efficiency of this motor M1 as well as the fuel economy, since the engine speed $N_E$ need not be held zero or substantially zero to reduce the pumping loss, and since the power distributing mechanism 16 is placed in its differential state under the control of the switching control means 50, in which the first electric motor M1 is freely rotatable. For example, the hybrid control means 52 controls the first electric motor M1 according to a motor-efficiency map (a highest-efficiency curve). An example of the motor-efficiency map is shown in FIG. 24. The motor-efficiency map, which is obtained by experimentation and stored in the map memory 56, for example, satisfies both the desired drivability and fuel economy, and is defined in a two-dimensional coordinate system having an axis along which the speed $N_{M1}$ of the first electric motor M1 is taken, and an axis along which the torque of the first electric motor M1 is taken. For instance, the first electric motor M1 is operated according to the highest-efficiency curve which defines a highest-efficiency area which is defined by the torque and speed $N_{M1}$ of the motor M1 and which provides the highest operating efficiency ηMax of the motor M1.

Figure 25:
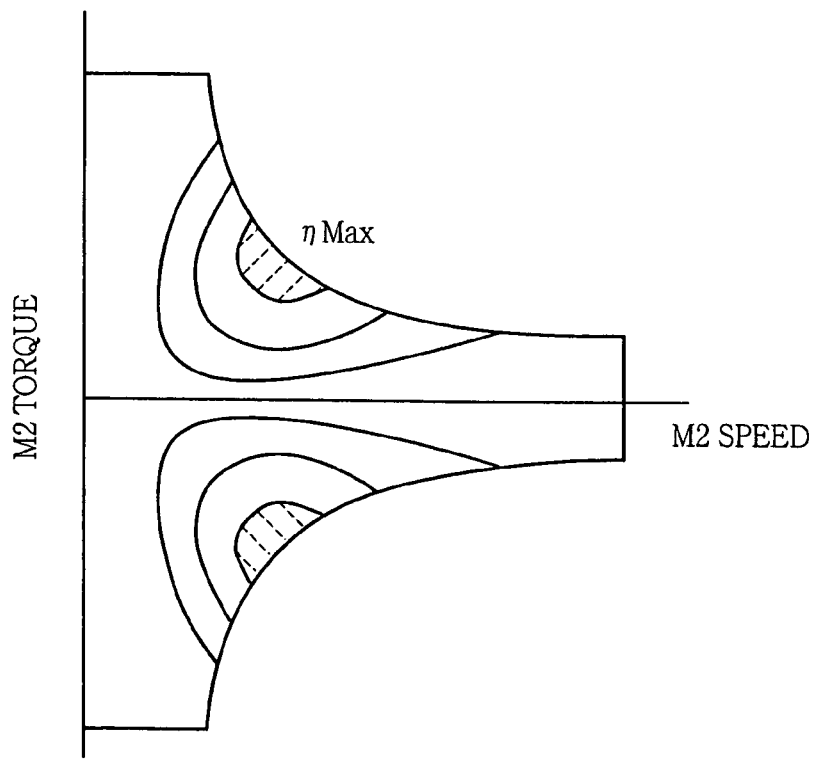
FIG. 25 is a view indicating an example of efficiency curves of a second electric motor.

FIG. 25 shows an example of a motor-efficiency map having iso-efficiency curves for the second electric motor M2, which is similar to the motor-efficiency map of FIG. 24. The iso-efficiency curves located above the horizontal axis of FIGS. 24 and 25 indicate the efficiency of the electric motors M1, M2 operated as the electric motors to produce a vehicle drive force, while those located below the horizontal axis indicate the efficiency of the electric motors M1, M2 operated as the electric generators to generate an electric energy. Hatched areas (indicated by broken hatching lines) indicate the highest-efficiency areas. The efficiency of the electric motors increases as the operating point defined by the speed and torque of the electric motors is moved toward the highest-efficiency areas.

In step S13 of the switching and shifting control routine illustrated in the flow chart of FIG. 22, the first electric motor M1 is controlled so as to zero or substantially zero the engine speed $N_E$, for prevent or reduce the tendency of dragging of the engine 8 to thereby improve the fuel economy when the vehicle is in the motor-drive mode. In the present fourth embodiment, however, the first electric motor M1 is controlled to be operated at an operating point that maximizes the efficiency of the electric motor M1, in the motor-drive mode of the vehicle.

As described above, the present fourth embodiment is arranged such that when the motor-drive mode is detected by the motor-drive determining means 80, the switching control means 50 commands the hydraulic control unit 42 to place the power distributing mechanism 16 in the differential state in which the first electric motor M1 is freely rotatable and the speed $N_{M1}$ of the first electric motor M1 and the engine speed $N_E$ are not influenced or governed by the vehicle speed V, that is, by the speed of the power transmitting member 18. In the pressure-change restricted state of the engine 8 in the motor-drive mode of the vehicle, therefore, it is not necessary to prevent the tendency of dragging of the engine 8 due to the pumping loss, so that the operation of the first electric motor M1 can be controlled by the hybrid control means 52, so as to be operated with an efficiency as high as possible, and so as to to improve the fuel economy. In other words, the pumping loss of the engine 8 can be reduced in the pressure-change restricted state (in which a change of the pressure in each of the at least one pressure-change restricted cylinder is restricted), without a need of zeroing or substantially zeroing the engine speed $N_E$, even when the first electric motor M1 is operated so as to maximize its operating efficiency. Accordingly, the fuel economy of the vehicle can be improved together with an improvement of the operating efficiency of the first electric motor M1.

Fifth Embodiment

Figure 26:
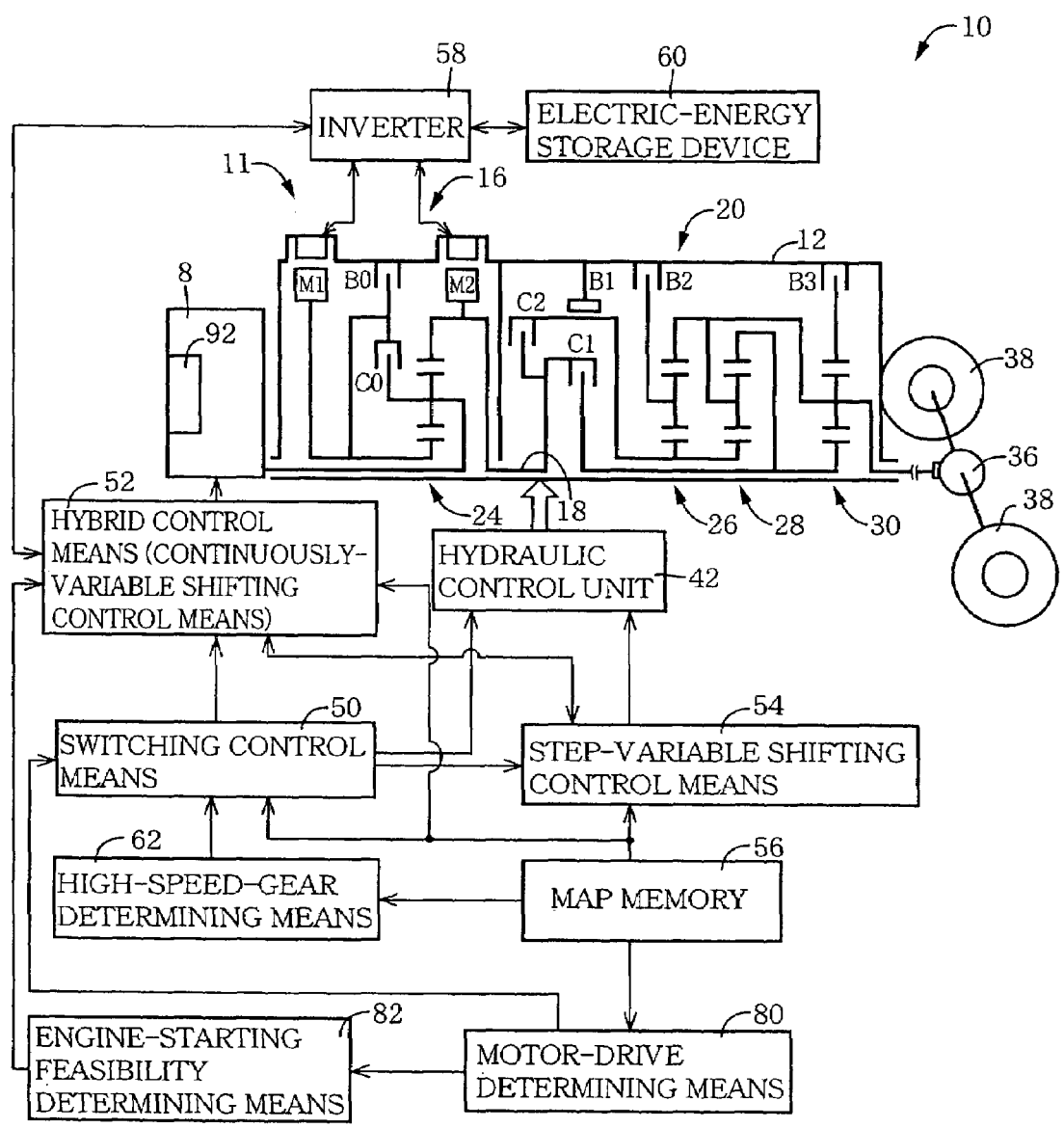
FIG. 26 a functional block diagram corresponding to that of FIG. 7, illustrating major control functions performed by the electronic control device in a yet further embodiment of this invention.

Reference is now made to the functional block diagram of FIG. 26 showing major control functions performed by the electronic control device 40 arranged to control the transmission mechanism 10 of FIG. 1 according to a fifth embodiment of this invention. The electronic control device 40 according to the fifth embodiment is different from that of the first embodiment of FIG. 7, in that the electronic control device 40 according to the fifth embodiment does not include the manual selection determining means 84. As in the first embodiment, the engine-starting requirement determining means 82 is provided in the present fourth embodiment.

As described above with respect to the first embodiment of FIG. 7, the engine-starting requirement determining means 84 is operated, upon determination by the motor-drive determining means 80 that the vehicle is in the motor-drive mode, to determine whether the starting of the engine is required. This determination may be made, for instance, by determining whether the power drive mode is manually selected by a suitable switch such as the drive-mode selector switch 94 provided in the first embodiment. However, the determination may be made otherwise as described above with respect to the engine-starting requirement determining means 80 in the first embodiment of FIG. 7.

In the first embodiment, the switching control means 50 switches the power distributing mechanism 16 in the non-differential state or step-variable shifting state, to facilitate the ignition of the engine, upon determination by the engine-starting requirement determining means 84 that the starting of the engine 8 is required. In the present fifth embodiment, however, the power distributing mechanism 16 is held in the differential state or continuously-variable shifting state even upon determination of the requirement for the engine starting, but the hybrid control means 52 controls an operation of the first electric motor M1 so as to raise the rotating speed of the first sun gear S1 to thereby raise the engine speed $N_E$, for facilitating the ignition of the engine 8. In the differential state of the power distributing mechanism 16, the first electric motor M1 is freely rotatable. Upon determination that the engine starting is required in this differential state of the mechanism 16, the hybrid control means 52 controls the first electric motor M1 to be operated along the highest-economy map of FIG. 24, so as to maximize the fuel economy, in the same manner as described above with respect to the operation of the hybrid control means 52 when the engine 8 is operated in the pressure-change restricted state under the control of the cylinder-pressure-change restricting means 100 provided in the fourth embodiment of FIG. 23.

In step S14 of the control routine of FIG. 22, the fist electric motor M1 is controlled so as to zero or substantially zero the engine speed $N_E$, for preventing or reducing the tendency of dragging of the engine 8 and improving the fuel economy. In the present embodiment, however, the first electric motor M1 is operated with an operating efficiency as high as possible, so as to raise the engine speed $N_E$, upon determination that the engine starting is required, so that the ignition of the engine 8 is facilitated.

As described above, the present fifth embodiment is arranged such that when the motor-drive mode is detected by the motor-drive determining means 80, the switching control means 50 commands the hydraulic control unit 42 to place the power distributing mechanism 16 in the differential state in which the first electric motor M1 is freely rotatable and the speed $N_{M1}$ of the first electric motor M1 and the engine speed $N_E$ are not influenced or governed by the vehicle speed V, that is, by the speed of the power transmitting member 18. Upon determination by the engine-starting requirement determining means 82 that the engine starting is required in the motor-drive mode, therefore, the hybrid control means 52 controls the operation of the first electric motor M1 in an operating state suitable for maximizing the operating efficiency, so as to raise the engine speed $N_E$ from zero, for facilitating the starting of the engine 8 while improving the fuel economy.

The electronic control device 40 according to any one of the third, fourth and fifth embodiments of FIGS. 19, 23 and 26 is equally applicable to the transmission mechanism 70 according to the second embodiment of FIGS. 16-18.

The manually operable shifting-state selecting device in the form of the seesaw switch 44 (shown in FIG. 13) provided in the first and second embodiments may be provided in the above-described third, fourth and fifth embodiments. In the third, fourth and fifth embodiments, the power distributing mechanism 16 is automatically switched to one of the continuously-variable and step-variable shifting states, according to the shifting-state switching boundary line map of FIG. 21 (FIG. 8), and the automatic transmission portion 20 is automatically shifted according to the shifting boundary line map shown in FIG. 21 (FIG. 8). Where the seesaw switch 44 is provided in those embodiments, the power distributing mechanism 16 (transmission mechanism 10) is placed in the shifting state selected by the seesaw switch 44.

Figure 27:
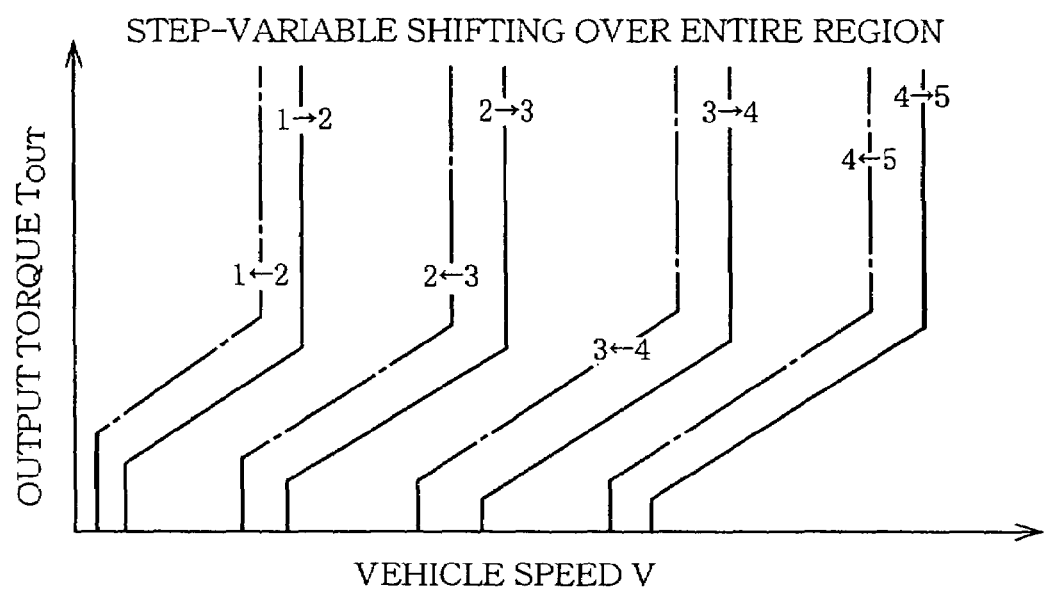
FIG. 27 is a view indicating an example of a stored shifting boundary line map used in the embodiment of FIG. 26 to control a shifting action of the automatic transmission portion.

When the step-variable-shifting state of the power distributing mechanism 16 (differential state of the differential portion 11) is selected by the seesaw switch 44, the automatic transmission portion 20 (transmission mechanism 10) is automatically shifted according to a shifting boundary line map shown in FIG. 27, which permits shift-up actions of the automatic transmission portion 20 to take place at lower values of the vehicle speed V than the shifting boundary line map of FIG. 21 (FIG. 8).

In the fourth embodiment of FIG. 23, a change of the pressure in each of the at least one pressure-change restricted cylinder of the four-cycle engine 8 is restricted to reduce the resistance to rotation of the crankshaft, by opening the intake or exhaust valve or changing the operating timing of the intake or exhaust valve, in the compression stroke, to place the cylinder in the decompression state. However, the restriction of the pressure change in each pressure-change restricted cylinder of the engine 8 to reduce the resistance to rotation of the crankshaft can be achieved by reducing the generation of a negative pressure in each pressure-change restricted cylinder by positively opening the throttle valve in an operating stroke of the cylinder other than the compression stroke, for example, in the intake stroke in which the volume in the cylinder is increased. This opening of the throttle valve may be effected in place of or in addition to the decompression of each pressure-change restricted cylinder. In this case, too, the pumping loss of the engine 8 can be reduced. Alternatively, the restriction of the pressure change in each pressure-change restricted cylinder may be achieved by mechanically disconnecting the pistons of the engine 8 from the crankshaft (input shaft 14), to stop reciprocation of the pistons due to rotation of the power transmitting member 18. Thus, the cylinder-pressure-change restricting means 112 may be arranged to restrict a change of the pressure in the at least one pressure-change restricted cylinder of the engine 8 in the motor-drive mode of the vehicle, by fully opening the throttle valve in the intake stroke or mechanically disconnecting the pistons from the crankshaft. Each pressure-change restricted cylinder is defined as a cylinder the pressure change of which is restricted in any one of its four operating strokes, to reduce the pumping loss of the engine 8.

The fuel-economy map shown in FIG. 21 is basically determined by the specifications of the engine 8, and are influenced by a condition of the vehicle such as internal factors and external factors of the engine 8. Accordingly, the fuel economy map changes with the internal and external factors of the engine 8 such as a cooling water temperature, a catalyst temperature, a working oil temperature, and a burning state (that is, an air/fuel ratio indicative of a lean-burn state, a stoichiometric state, etc.). Therefore, the hybrid control means 52 may be arranged to select one of a plurality of fuel-economy maps stored in the map memory 56, or change the stored single fuel-economy map in the real-time fashion, on the basis of the above-indicated internal and external factors.

While the several preferred embodiments of this invention have been described above by reference to the accompanying drawings, for illustrative purpose only, it is to be understood that the invention is not limited to the details of the illustrated embodiments, but may be embodied with various changes and modifications, as described below.

In the illustrated embodiments, the differential portion 11 is placed selectively in one of its differential state and non-differential state, so that the transmission mechanism 10, 70, 100, 110, 120 is switchable between the continuously-variable shifting state in which the transmission mechanism is operable as an electrically controlled continuously-variable transmission, and the step-variable shifting state in which the transmission mechanism is operable as a step-variable transmission. This relationship between the operating state of the differential portion 11 and the shifting state of the transmission mechanism 10, 70, 100, 110, 120 is not essential. In other words, the transmission mechanism need not be switchable between the continuously-variable and step-variable shifting states. For instance, the differential portion 11 may be operated as a step-variable transmission the speed ratio of which is variable in steps, even while the differential portion 11 is placed in the differential state. In this instance, the transmission mechanism is placed in a step-variable shifting state while the differential portion 11 is placed in the differential state. The principle of the present invention is applicable to any transmission mechanism (differential portion) which is switchable between the differentials state and the non-differential state.

In the power distributing mechanism 16 in the illustrated embodiments, the first carrier CA1 is fixed to the engine 8, and the first sun gear S1 is fixed to the first electric motor M2 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70, 100, 110, 120 in the illustrated embodiments, the switching clutch C0 need not be engaged to establish the neutral position.

The frictional coupling devices used as the switching clutch C1, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the automatic transmission portion 20, 72.

In the illustrated embodiments, the automatic transmission portion 20, 72 is disposed in the power transmitting path between the drive wheels 38, and the power transmitting member 18 which is the output member of the differential portion 11 or power distributing mechanism 16. However, the automatic transmission portion 20, 72 may be replaced by any other type of power transmitting device such as a continuously variable transmission (CVT), which is a kind of an automatic transmission. Where the continuously variable transmission (CVT) is provided, the transmission mechanism as a whole is placed in a step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of the automatic transmission portion 20, 72, under step-variable shifting control means which stores data indicative of the predetermined speed ratios. It is also noted that the principle of the present invention is applicable to a vehicular drive system not including the automatic transmission portion 20, 72.

While the automatic transmission portion 20, 72 is connected in series to the differential portion 11 through the power transmitting member 18 in the illustrated embodiments, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided in the illustrated embodiments may be replaced by a differential gear device including a pinion rotated by the engine 8, and a pair of bevel gears which are respectively operatively connected to the first and second electric motors M1, M2.

Although the power distributing mechanism 16 is constituted by one planetary gear set in the illustrated embodiments, the power distributing mechanism 16 may be constituted by two or more planetary gear sets and arranged to be operable as a transmission having three or more gear positions when placed in its non-differential state (fixed-speed-ratio shifting state).

In the illustrated embodiments, the shift lever 92 placed in its manual forward-drive shifting position M permits the selection of at least one of the gear positions "D" through "L" which is available in the automatic shifting of the automatic transmission portion 20, 72 according to the shifting boundary line map. However, the shift lever 92 may be arranged to manually select a desired one of the first-gear through fourth-gear positions of the automatic transmission 20, 72, according to a manual operation of the shift lever 92 from the manual forward-drive shifting position M to the shift-up position "+" or shift-down position "−". Further, the shift lever 92 may be replaced by pushbutton switches, a slide-type or any other type of switch manually operable to select a desired one of the gear positions.

While the switch 44 is of a seesaw type switch in the illustrated embodiments, the switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The switch 44 may or may not have a neutral position. Where the switch 44 does not have the neutral position, an additional switch may be provided to enable and disable the switch 44. The function of this additional switch corresponds to the neutral position of the switch 44.

In the illustrated embodiments, the switching control means places the transmission mechanism 10, 70 selectively in one of the continuously-variable and step-variable shifting states, according to the switching boundary line map shown in FIGS. 8 and 21, which defines the continuously-variable shifting region and the step-variable shifting region. However, the switching control means 50 may be arranged to normally hold the transmission mechanism 10, 70 in the continuously-variable shifting state, and to place it in the step-variable shifting state when the step-variable shifting state is manually selected by the switch 44. In this case, the vehicle operator need not operate the switch 44 to select the continuously-variable shifting state, and the switch 44 need not be arranged to select the continuously-variable shifting state.

The manually operable shifting device 90 includes the shift lever 92, the shift lever 92 may be replaced by pushbutton switches, a slide-type switch or any other type of switch or switching device operable to select a plurality of positions such as "D" through "U".

It is to be understood that other changes and modifications may be made in the present invention, which may occur to those skilled in the art, in the light of the foregoing teachings.

What is claimed is:

1. A control device for a vehicular drive system including a differential mechanism operable to distribute an output of an engine to a first electric motor and a power transmitting member, and a second electric motor capable of transmitting power to a drive wheel of a vehicle, said control device comprising:
   a differential-state switching device operable to place said differential mechanism selectively in one of a differential state and a non-differential state; and
   switching control means operable to control said differential-state switching device, so as to place said differential mechanism in said differential state when the vehicle is in a motor-drive mode in which at least one of said first and second electric motors is used as a drive power source to drive the vehicle.

2. The control device according to claim 1, further comprising a shifting-state selecting device manually operable to select one of said differential and non-differential states of said differential mechanism, and wherein said switching control means controls said differential-state switching device so as to place said differential mechanism in said differential state in said motor-drive mode of the vehicle, even when said non-differential state is selected by said shifting-state selecting device.

3. The control device according to claim 1, further comprising engine-starting requirement determining means for determining whether starting of said engine is required, and wherein said switching control means controls said differential-state switching device so as to switch said differential mechanism to said non-differential state, even in said motor-drive mode of the vehicle, when said engine-starting requirement determining means has determined that the staffing of the engine is required.

4. The control device according to claim 3, fufther comprising a drive-mode selector switch manually operable to select a power drive mode in which the vehicle is driven with a higher degree of drivability than in a normal drive mode, and wherein said engine-starting requirement determining means determines that the staffing of the engine is required, when said power drive mode is selected by said drive-mode selector switch.

5. The control device according to claim 1, wherein said differential mechanism has a first element fixed to said engine, a second element fixed to said first electric motor, and a third element fixed to said power transmitting member, and said differential-state switching device is operable to permit said first, second and third elements to be rotatable relative to each other, for thereby placing said differential mechanism in said differential state, and to connect said first, second and third elements to each other for rotation as a unit or hold said second element stationary, for thereby placing said differential mechanism in said non-differential state.

6. The control device according to claim 5, wherein said differential-state switching device includes a clutch operable to connect selected two of said three elements to each other for rotation of said first, second and third elements as a unit, and/or a brake operable to fix said second element to a stationary element for holding said second element stationary.

7. The control device according to claim 1, wherein said vehicular drive system further includes a step-variable automatic transmission disposed in said power transmitting path between said power transmitting member and said drive wheel.

8. The control device according to claim 7, wherein said power differential mechanism includes a first planetary gear set having three elements consisting of a sun gear, a carrier and a ring gear, said three elements are arranged as a second element, a first element and a third element, respectively, said first element being fixed to said engine, said second element being fixed to said first electric motor, while said third element being fixed to said power transmitting member, said differential mechanism further including a switching clutch operable to connect said second element to said first element, and/or a switching brake operable to fix said second element to a stationary member, said differential being placed in a differential state by releasing said switching clutch and/or said switching brake, and in a fixed-speed-ratio shifting state in which said differential mechanism has a fixed speed ratio, by engaging said switching clutch and/or said switching brake, and wherein said step-variable automatic transmission includes a second planetary gear set, a third planetary gear set and a fourth planetary gear set, and has five rotary elements each of which is constituted by at least one of sun gears, carriers and ring gears of said second, third and fourth planetary gear sets, said five rotary elements are arranged as a fourth element, a fifth element, a sixth element, a seventh element and an eighth element, respectively, said fourth element being selectively connected through a second clutch to said power transmitting member and selectively fixed through a first brake to the stationary member, and said fifth element being selectively fixed through a second brake to the stationary member, while said sixth element being selectively fixed through a third brake to the stationary member, said seventh element being fixed to an output rotary member of said step-variable automatic transmission, said eighth element being selectively connected through a first clutch to said power transmitting member, said step-variable automatic transmission having a plurality of operating positions that are established by engaging actions of respective combinations of said first clutch, second clutch, first brake, second brake and third brake.

9. The control device according to claim 7, wherein said differential mechanism includes a first single-pinion planetary gear set having a first sun gear, a first carrier and a first ring gear, said first carrier being fixed to said engine, and said first sun gear being fixed to said first electric motor, while said first ring gear being fixed to said power transmitting member, said differential mechanism further including a switching clutch operable to connect said first carrier and said first sun gear to each other, and/or a switching brake operable to fix said first sun gear to a stationary member, and wherein said step-variable automatic transmission includes a second single-pinion planetary gear set, a third planetary single-pinion gear set and a fourth single-pinion planetary gear set, said second planetary gear set having a second sun gear, a second carrier and a second ring gear, and said third planetary gear set having a third sun gear, a third carrier and a third ring gear, while said fourth planetary gear set having a fourth sun gear, a fourth carrier and a fourth ring gear, said second sun gear and said third sun gear being selectively connected through a second clutch to said power transmitting member and selectively fixed through a first brake to the stationary member, and said second carrier being selectively fixed through a second brake to the stationary member, while said fourth ring gear being selectively fixed through a third brake to the stationary member, and wherein said second ring gear, said third carrier and said fourth carrier are fixed to an output rotary member of said step-variable automatic transmission, and said third ring gear and said fourth sun gear are selectively connected through a first clutch to said power transmitting member.

10. The control device according to claim 7, wherein said differential mechanism includes a first planetary gear set having three elements consisting of a sun gear, a carrier and a ring gear, said three elements are arranged as a second element, a first element and a third element, respectively, said first element being fixed to said engine, said second element being fixed to said first electric motor, while said third element being fixed to said power transmitting member, said differential mechanism further including a switching clutch operable to connect said second element to said first element, and/or a switching brake operable to fix said second element to a stationary member, said differential mechanism being placed in a differential state by releasing said switching clutch and/or said switching brake, and in a fixed-speed-ratio shifting state in which said power distributing mechanism has a fixed speed ratio, by engaging said switching clutch and/or said switching brake, and wherein said step-variable automatic transmission includes a second planetary gear set and a third planetary gear set, and has four rotary elements each of which is constituted by at least one of sun gears, carriers and ring gears of said second and third planetary gear sets, said four rotary elements are arranged as a fourth element, a fifth element, a sixth element and a seventh element, respectively, said fourth element being selectively connected through a second clutch to said power transmitting member and selectively fixed through a first brake to the stationary member, and said fifth element being selectively fixed through a second brake to the stationary member, while said sixth element being fixed to an output rotary member of said step-variable automatic transmission, said seventh element being selectively connected through a first clutch to said power transmitting member, said step-variable automatic transmission having a plurality of operating positions that are established by engaging actions of respective combinations of said first clutch, second clutch, first brake and second brake.

11. The control device according to claim 7, wherein said differential mechanism includes a first single-pinion planetary gear set having a first sun gear, a first carrier and a first ring gear, said first carrier being fixed to said engine, and said first sun gear being fixed to said first electric motor, while said first ring gear being fixed to said power transmitting member, said differential mechanism further including a switching clutch operable to connect said first carrier and said first sun gear to each other, and/or a switching brake operable to fix said first sun gear to a stationary member, and wherein said step-variable automatic transmission includes a second single-pinion planetary gear set and a third single-pinion planetary gear set, said second planetary gear set having a second sun gear, a second carrier and a second ring gear, and said third planetary gear set having a third sun gear, a third carrier and a third ring gear, said second sun gear and said third sun gear being selectively connected through a second clutch to said power transmitting member and selectively fixed through a first brake to the stationary member, and said third carrier being selectively fixed through a second brake to the stationary member, while said second carrier and said third ring gear being fixed to an output rotary element of said step-variable automatic transmission, said second ring gear being selectively connected through a first clutch to said power transmitting member.

12. A control device for a vehicular drive system including a differential mechanism operable to distribute an output of an engine to a first electric motor and a power transmitting member, and a second electric motor capable of transmitting power a drive wheel of a vehicle, said control device comprising:
a differential-state switching device operable to place said differential mechanism selectively in one of a differential state and a non-differential state;
engine-staffing requirement determining means for determining whether staffing of said engine is required; and
switching control means operable to control said differential-state switching device, so as to place said differential mechanism in said non-differential state when said engine-staffing requirement determining means has determined that the staffing of the engine is required in a motor-drive mode of the vehicle in which at least one of said first and second electric motors is used as a drive power source to drive the vehicle.

13. A control device for a vehicular drive system including a differential portion having a differential mechanism operable to distribute an output of an engine to a first electric motor and a power transmitting member, and a second electric motor capable of transmitting power to a drive wheel of a vehicle, said vehicular drive system further including an automatic transmission portion which constitutes a portion of said power transmitting path and which functions as an automatic transmission said control device comprising:
a differential-state switching device operable to place said differential mechanism selectively in one of a differential state and a non-differential state; and
switching control means for controlling said differential-state switching device, so as to place said differential mechanism in said differential state when the vehicle is in a motor-drive mode in which at least one of said first and second electric motors is used as a drive power source to drive the vehicle.

14. The control device according to claim 13, further comprising hybrid control means operable to control a speed of said first electric motor so as to zero or substantially zero a speed of said engine, when the vehicle in said motor-drive mode.

15. The control device according to claim 13, wherein said engine has a plurality of cylinders at least one of which is selectable as at least one pressure-change restricted cylinder the number of which is variable, said engine being operable in a cylinder-pressure-change restricted state in which a change of a pressure in each of said at least one pressure-change restricted cylinder is restricted,
and wherein a hybrid control means controls an operation of said first electric motor so as to improve an operating efficiency of the first electric motor, when the engine is operated in said pressure-change restricted state while the vehicle is in said motor-drive mode.

16. The control device according to claim 13, further comprising engine-staffing requirement determining means for determining whether starting of said engine is required,
and wherein a hybrid control means controls an operation of said first electric motor so as to improve an operating efficiency of the first electric motor and to raise a speed of said engine for starting the engine, when said engine-starting requirement determining means has determined that the starting of the engine is required while the vehicle is in said motor-drive mode.

17. The control device according to claim 13, wherein that said differential portion is placed in a continuously-variable shifting state in which the differential portion is operable as an electrically controlled differential device, when said differential mechanism is switched by said differential-state switching device to said differential state under the control of said switching control means, and is placed in a step-variable shifting state in which the differential portion is not operable as said electrically controlled differential device, when said differential mechanism is switched by said differential-state switching device to said non-differential state under the control of said switching control means.

18. The control device according to claim 13, wherein that said differential mechanism has a first element fixed to said engine, a second element fixed to said first electric motor, and a third element fixed to said power transmitting member, and said differential-state switching device includes at least one coupling device operable to permit said first, second and third elements to be rotatable relative to each other, for thereby placing said differential mechanism in said differential state, and to connect said first, second and third elements to each other for rotation as a unit or hold said second element stationary, for thereby placing said differential mechanism in said non-differential state.

19. The control device according to claim 18, wherein said at least one coupling device includes a clutch operable to connect selected two of said three elements to each other for rotation of said first, second and third elements as a unit, and/or a brake operable to fix said second element to a stationary element for holding said second element stationary.

20. The control device according to claim 19, wherein said at least one coupling device includes both of said clutch and said brake, which are engaged to place said differential mechanism in said differential state in which said first, second and third elements are rotatable relative to each other, said differential mechanism being operable as a transmission having a speed ratio of 1 while said clutch is engaged, and as a speed-increasing transmission having a speed ratio lower than 1 while said brake is engaged.

21. The control device according to claim 18, wherein said differential mechanism includes a planetary gear set, and said first, second and third elements are respectively a carrier, a sun gear and a ring gear of said planetary gear set.

22. The control device according to claim 21, wherein said single-pinion planetary gear set.

23. The control device according to claim 13, wherein an overall speed ratio of said vehicular drive system is determined by a speed ratio of said automatic transmission portion and a speed ratio of said differential portion.

24. The control device according to claim 13, wherein said automatic transmission portion is a step-variable automatic transmission.

25. The control device according to claim 24, wherein said power differential mechanism includes a first planetary gear set having three elements consisting of a sun gear, a carrier and a ring gear, said three elements are arranged as a second element, a first element and a third element, respectively, said first element being fixed to said engine, said second element being fixed to said first electric motor, while said third element being fixed to said power transmitting member, said differential mechanism further including a switching clutch operable to connect said second element to said first element, and/or a switching brake operable to fix said second element to a stationary member, said differential being placed in a differential state by releasing said switching clutch and/or said switching brake, and in a fixed-speed-ratio shifting state in which said differential mechanism has a fixed speed ratio, by engaging said switching clutch and/or said switching brake,
and wherein said step-variable automatic transmission includes a second planetary gear set, a third planetary gear set and a fourth planetary gear set, and has five rotary elements each of which is constituted by at least one of sun gears, carriers and ring gears of said second, third and fourth planetary gear sets, said five rotary elements are arranged as a fourth element, a fifth element, a sixth element, a seventh element and an eighth element, respectively, said fourth element being selectively connected through a second clutch to said power transmitting member and selectively fixed through a first brake to the stationary member, and said fifth element being selectively fixed through a second brake to the stationary member, while said sixth element being selectively fixed through a third brake to the stationary member, said seventh element being fixed to an output rotary member of said step-variable automatic transmission, said eighth element being selectively connected through a first clutch to said power transmitting member, said step-variable automatic transmission having a plurality of operating positions that are established by engaging actions of respective combinations of said first clutch, second clutch, first brake, second brake and third brake.

26. The control device according to claim 24, wherein said differential mechanism includes a first single-pinion planetary gear set having a first sun gear, a first carrier and a first ring gear, said first carrier being fixed to said engine, and said first sun gear being fixed to said first electric motor, while said first ring gear being fixed to said power transmitting member, said differential mechanism further including a switching clutch operable to connect said first carrier and said first sun gear to each other, and/or a switching brake operable to fix said first sun gear to a stationary member,
and wherein said step-variable automatic transmission includes a second single-pinion planetary gear set, a third single-pinion planetary gear set and a fourth planetary gear set of single-pinion type, said second planetary gear set having a second sun gear, a second carrier and a second ring gear, and said third planetary gear set having a third sun gear, a third carrier and a third ring gear, while said fourth planetary gear set having a fourth sun gear, a fourth carrier and a fourth ring gear, said second sun gear and said third sun gear being selectively connected through a second clutch to said power transmitting member and selectively fixed through a first brake to the stationary member, and said second carrier being selectively fixed through a second brake to the stationary member, while said fourth ring gear being selectively fixed through a third brake to the stationary member, and wherein said second ring gear, said third carrier
and said fourth carrier are fixed to an output rotary member of said step-variable automatic transmission, and said third ring gear and said fourth sun gear are selectively connected through a first clutch to said power transmitting member.

27. The control device according to claim 24, wherein said differential mechanism includes a first planetary gear set having three elements consisting of a sun gear, a carrier and a ring gear, said three elements are arranged as a second element, a first element and a third element, respectively, said first element being fixed to said engine, said second element being fixed to said first electric motor, while said third element being fixed to said power transmitting member, said differential mechanism further including a switching clutch operable to connect said second element to said first element, and/or a switching brake operable to fix said second element to a stationary member, said differential mechanism being placed in a differential state by releasing said switching clutch and/or said switching brake, and in a fixed-speed-ratio shifting state in which said power distributing mechanism has a fixed speed ratio, by engaging said switching clutch and/or said switching brake,
and wherein said step-variable automatic transmission includes a second planetary gear set and a third planetary gear set, and has four rotary elements each of which is constituted by at least one of sun gears, carriers and ring gears of said second and third planetary gear sets, said four rotary elements are arranged as a fourth element, a fifth element, a sixth element and a seventh element, respectively, said fourth element being selectively connected through a second clutch to said power transmitting member and selectively fixed through a first brake to the stationary member, and said fifth element being selectively fixed through a second brake to the stationary member, while said sixth element being fixed to an output rotary member of said step-variable automatic transmission, said seventh element being selectively connected through a first clutch to said power transmitting member, said step-variable automatic transmission having a plurality of operating positions that are established by engaging actions of respective combinations of said first clutch, second clutch, first brake and second brake.

28. The control device according to claim 24, wherein said differential mechanism includes a first single-pinion planetary gear set having a first sun gear, a first carrier and a first ring gear, said first carrier being fixed to said engine, and said first sun gear being fixed to said first electric motor, while said first ring gear being fixed to said power transmitting member, said differential mechanism further including a switching clutch operable to connect said first carrier and said first sun gear to each other, and/or a switching brake operable to fix said first sun gear to a stationary member, and wherein said step-variable automatic transmission includes a second single-pinion planetary gear set and a third single-pinion planetary gear set, single-pinion said second planetary gear set having a second sun gear, a second carrier and a second ring gear, and said third planetary gear set having a third sun gear, a third carrier and a third ring gear, said second sun gear and said third sun gear being selectively connected through a second clutch to said power transmitting member and selectively fixed through a first brake to the stationary member, and said third carrier being selectively fixed through a second brake to the stationary member, while said second carrier and said third ring gear being fixed to an output rotary element of said step-variable automatic transmission, said second ring gear being selectively connected through a first clutch to said power transmitting member.

* * * * *

UNITED STATES PATENT AND TRADEMARK OFFICE
CERTIFICATE OF CORRECTION

PATENT NO. : 7,322,902 B2
APPLICATION NO. : 11/121988
DATED : January 29, 2008
INVENTOR(S) : Atsushi Tabata et al.

It is certified that error appears in the above-identified patent and that said Letters Patent is hereby corrected as shown below:

| Column | Line | |
|---|---|---|
| 8 | 66 | Change "sped" to --speed--. |
| 9 | 51 | After "FIG. 23" insert --is--. |
| 9 | 60 | After "FIG. 26" insert --is--. |
| 12 | 50 | Change "gear ratio 65 4" to --gear ratio $\rho 4$--. |
| 13 | 38 | Change "neural" to --neutral--. |
| 14 | 25 | Change "0705" to --0.705--. |
| 14 | 36 | Change "switching clutch C1" to --switching clutch C0--. |
| 18 | 33 | Change "mount" to --amount--. |
| 19 | 27 | After "according" insert --to--. |
| 20 | 48 | After "crankshaft)" insert --.--. |
| 21 | 53 | Change "fixed speed ratio 70" to --fixed speed ratio $\gamma 0$--. |
| 25 | 35 | Change "likes" to --wants--. |
| 25 | 39 | Change "likes" to --wants--. |
| 27 | 1 | Before "started" change "the" to --be--. |
| 28 | 66 | Change "shown n" to --shown in--. |
| 32 | 9 | Change "neural" to --neutral--. |

UNITED STATES PATENT AND TRADEMARK OFFICE
CERTIFICATE OF CORRECTION

PATENT NO.       : 7,322,902 B2
APPLICATION NO.  : 11/121988
DATED            : January 29, 2008
INVENTOR(S)      : Atsushi Tabata et al.

It is certified that error appears in the above-identified patent and that said Letters Patent is hereby corrected as shown below:

| Column | Line | |
|---|---|---|
| 33 | 25 | Change "switching clutch C1" to --switching clutch C0--. |
| 33 | 27 | After "embodiments" insert --.--. |
| 35 | 6 | Change "step Si" to --step S1--. |
| 36 | 8 | Change "TOUT" to --$T_{OUT}$--. |
| 43 | 9 | Change "for prevent" to --to prevent--. |
| 44 | 29 | Change "fist" to --first--. |
| 49 | 10 | Change "fuffher" to --further--. |
| 49 | 15 | Change "staffing" to --starting--. |
| 51 | 49 | After "power" insert --to--. |
| 51 | 54 | Change "engine-staffing" to --engine-starting--. |
| 51 | 59 | Change "engine-staffing" to --engine-starting--. |
| 51 | 60 | Change "staffing" to --starting--. |
| 52 | 19 | After "vehicle" insert --is--. |
| 52 | 34 | Change "engine-staffing" to --engine-starting--. |
| 53 | 22 | After "said" insert --planetary gear set is a--; after "set" insert --.--. |

UNITED STATES PATENT AND TRADEMARK OFFICE
CERTIFICATE OF CORRECTION

PATENT NO. : 7,322,902 B2
APPLICATION NO. : 11/121988
DATED : January 29, 2008
INVENTOR(S) : Atsushi Tabata et al.

It is certified that error appears in the above-identified patent and that said Letters Patent is hereby corrected as shown below:

| Column | Line | |
|---|---|---|
| 56 | 1 | Delete "single-pinion" (second occurrence). |

Signed and Sealed this

Twelfth Day of May, 2009

JOHN DOLL
*Acting Director of the United States Patent and Trademark Office*